(12) United States Patent
Shiga et al.

(10) Patent No.: US 6,409,012 B2
(45) Date of Patent: *Jun. 25, 2002

(54) DISK CARTRIDGE STORAGE CASE AND INDEX CARD

(75) Inventors: Hideaki Shiga; Kazuo Mukouhara, both of Kanagawa; Kazuaki Taga; Yutaka Senda, both of Tokyo, all of (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/352,635

(22) Filed: Jul. 13, 1999

Related U.S. Application Data

(62) Division of application No. 08/916,614, filed on Aug. 22, 1997, now Pat. No. 5,960,948.

(30) Foreign Application Priority Data

Aug. 23, 1996 (JP) .............................. 8-222784
Aug. 23, 1996 (JP) .............................. 8-222785
Aug. 23, 1996 (JP) .............................. 8-222786
Aug. 23, 1996 (JP) .............................. 8-222787
Aug. 23, 1996 (JP) .............................. 8-222788

(51) Int. Cl.[7] .............................................. B65D 85/57
(52) U.S. Cl. .................... 206/232; 206/308.3; 428/124
(58) Field of Search ..................... 40/380, 340, 672; 428/119, 121, 124; 283/81; 206/308.3, 232, 307

(56) References Cited

U.S. PATENT DOCUMENTS 3,860,248 A   1/1975  Hunt et al. ..................... 274/1
4,635,797 A   1/1987  Bankier ....................... 206/472
4,784,408 A * 11/1988 Yasuda ......................... 238/81
5,168,998 A  12/1992  Satoh et al. ................. 206/387
5,186,325 A   2/1993  Sato et al. ................... 206/232
5,242,049 A   9/1993  Mizuno et al. ............. 206/313
5,261,175 A * 11/1993 Gebka .......................... 40/675
5,310,054 A   5/1994  Stumpff et al. ............. 206/310
5,381,893 A   1/1995  Hashizume et al. ........ 206/232
5,385,235 A   1/1995  Ikebe et al. ............... 206/308.1
5,518,116 A   5/1996  Morita ..................... 206/387.1
5,531,324 A   7/1996  Kosaki et al. .............. 206/449
5,540,328 A   7/1996  Kohtake ................... 206/308.1
5,782,352 A   7/1998  Senda ..................... 206/308.3

FOREIGN PATENT DOCUMENTS

| JP | 63-7694    | 1/1988  |
| JP | 02-108894  | 8/1990  |
| JP | 06-47185   | 6/1994  |
| JP | 06-247485  | 6/1994  |
| JP | 06-61783   | 8/1994  |
| JP | 3007313    | 11/1994 |

* cited by examiner

Primary Examiner—Alexander S. Thomas
(74) Attorney, Agent, or Firm—Brinks Hofer Gilson & Lione; G. Peter Nichols

(57) ABSTRACT

An MD cartridge storage case 1 is constituted by a storage case body 3 and a cover 15 openably/closably provided on the storage case body 3. An index sheet 40 inserted into the storage case body 3 with the cover 15 opened is brought into contact with a stepped portion 4b provided at the front edge of a bottom wall portion 4 of the storage case body 3 so that index sheet 40 is disposed in a predetermined position. The index sheet 40 is fixedly held when the cover 15 of the storage case body 3 is closed. Therefore, it is possible to provide a superior disk cartridge storage case in which not only an index sheet can be easily disposed in the storage case, but also the index sheet can be prevented from easily coming off therefrom.

3 Claims, 21 Drawing Sheets

DISK CARTRIDGE STORAGE CASE AND INDEX CARD

This application is a division of application Ser. No. 08/916,614, filed Aug. 22. 1997, U.S. Pat. No. 5,960,948.

BACKGROUND OF THE INVENTION

The present invention relates to a disk cartridge storage case for storing a disk cartridge having a built-in disk-like information recording medium, and particularly relates to a disk cartridge storage case for storing a mini-disk cartridge which stores therein in a photomagnetic disk having a diameter of 2.5 inches.

Further, the present invention also relates to an index card used for a cartridge storage case which can stOre a cartridge built-in disk-like information recording medium such as a mini-disk (hereinafter referred to as the MD) through a slot in a storage portion thereof, and particularly relates to a structure designed to improve the durability of an index card.

A disk cartridge has a built-in information recording medium, such am a magnetic disk, an optical disk, a disk, etc. Recently, the size of such a disk cartridge has become able to be reduced as the density of information recording has become high. As such a disk cartridge with a reduced size, a mini-disk disk cartridge with a built-in mini-disk having a diameter of 2.5 inches, called "MD", has been put into practical use.

The MD cartridge generally uses such a storage case 61 as shown in FIG. 1, in order to protect the whole of the cartridge from an external impact or in order to prevent dust from entering the cartridge to thereby make the storage and carrying of the cartridge easy and sure.

As shown in FIG. 1, the conventional storage case 61 is constituted by a box-shaped body in which a cartridge storage space 63 of a thin parallelepiped shape is formed in order to store an MD cartridge 60 therein. An insertion port 62 for loading the MD cartridge 60 is opened in one side surface of the storage case 61. In addition, arched spring members 65 and 65 are disposed on opposite side walls 64 and 64 which define the cartridge storage space 63. Further, at least the upper wall is formed from transparent resin (such as polycarbonate, polystyrene, AS resin, or the like).

The spring members 65 and 65 project into the storage space 63 so as to elastically engage with recess portions 60a and 60a formed in opposite side walls of the MD cartridge 60, when the MD cartridge 60 is inserted into the storage space 63 through the insertion port 62. Thus, the MD cartridge 60 is held so n not to come of from the storage case 61 unexpectedly.

When an index sheet on which recording contents of a disk, etc., is written is put into such a storage case 61, it is necessary to insert the index sheet into the narrow storage space 63 through the insertion port 62. However, if the index sheet is designed to be large enough so that the index sheet does not easily come off when it is forced into the storage space 63, the capability of insertion of the index sheet becomes low so that the handling becomes poor. On the other hand, if the index sheet is designed to be small enough so that the index sheet can be inserted easily into the storage space 63, the index sheet may come off easily. Conventionally, therefore, the index sheet is provided in the form of an application seal so that the application seal can be stuck onto the external surface of the storage case 61.

However, when the index sheet is stuck on the external surface of the storage case 61, there is a problem that the index sheet is apt to be dirty so that items mentioned on the index sheet becomes impossible to be read.

In addition, as shown in FIG. 2, as a conventional cartridge storage case for storing detachably a cartridge 390 with a built in disk recording medium, there is a cartridge storage case 381 comprising a case body 382 of flat parallelepiped provided with an inner space 383 which can store the cartridge 380.

A insertion port 384 is formed at the upper end In FIG. 2 showing a case body 382, and a dimension A of the insertion port 384 in the direction from left to right in FIG. 2 is larger than a dimension B of the cartridge 380 in the direction from left to right in FIG. 2. The cartridge 380 is stored in an internal space 383 via the insertion port 384 and detached therefrom.

A case storing the MD is taken and explained hereinafter as an example of the conventional cases. In the vicinity of the innermost portion (the lower end in FIG. 2) of the inner space 383 of the case body 382 is provided a pair of lock members 385 capable of oelstic deformation. The lock members 385 are respectively and detachably in engagement with recesses 311 provided on an MD cartridge 380 to hold the MD cartridge 380 to the case body 382.

In the conventional cartridge storage case 381 described above, there is a problem wherein because of too large dimension of a gap C (=dimension A–dimension B), if, for example, one holds a round corner portion of the cartridge 380 by a fingertip 386 and tries to insert the cartridge into the case body 382, the posture of the cartridge 380 is apt to oblique relative to the insertion port 394. Thereby, it is a great possibility that the cartridge 380 is held and caught between a point D in the vicinity of the insertion port 384 and the lock member 385 on the right side in FIG. 2.

In the case of storing the MD, there is a problem wherein if the cartridge 380 is forced into the case body 382, the cartridge 380 itself or the lock member 385 of the cartridge storage case 391 is damaged, and then it becomes impossible to pull out the cartridge 380. There is also a problem in the carriage of the cartridge storage case in which the cartridge 380 vibrates and generates unpleasant noise.

Further, as shown in FIG. 3, as a cartridge storage came for storing a cartridge, such as the MD, etc, (not illustrated herein), there is currently available a so-called slot-in storage case.

This storage case 450 is so constructed that a case body 452 of a flat parallelepiped is provided with an insertion port 451 and an inner space 453 to detachably store a cartridge through the insertion port.

When it is desired to detachably attach through the insertion port 451 an index card 454 on which the recording content in the MD, etc is recorded or written, inasmuch as such cartridge storage case is basically constructed to permit a cartridge to be inserted/ejected through the insertion port, the index card has an area in the vicinity of the insertion port side edge 455, particularly, sites shown by a symbol F in FIG. 3, which are cut by cutter, etc. during production of the index card proper and which are subject to deterioration due to rubbing with cartridges, In some cases, cracks occur or wavy wrinkles generate in the insertion direction of the cartridge.

As a result, in the storage cases of the so-called slot-in type, improvement in the durability of index cards was called for.

SUMMARY OF THE INVENTION

It is an object of the present invention to solve the foregoing problem, and particularly it is an object of first, second and third aspects the present invention to provide a disk cartridge storage case in which an index sheet can be disposed in the storage case easily, and can be prevented from easily coming off from the storage case.

The above object of the first, second and third aspects of the present invention can be achieved by a disk cartridge storage case in which a box-shaped body having a disk cartridge storage space and a disk cartridge insertion port communicating with the storage space is constituted by a storage case body and a cover openably/closably provided on the storage case body, wherein a forward end of an index sheet inserted into the storage case body in a state where the cover is opened contacts with a stepped portion formed on a front end of a bottom wall portion of the storage case body so that the index sheet is disposed in a predetermined position, and the index sheet is fixedly held when the storage case body and the cover are closed relative to each other.

That is, according to the above-mentioned configuration, not only an index sheet can be easily disposed in the storage space if the storage case body and the cover are opened relative to each other, but also the index sheet can be fixedly held and prevented from easily coming off if the storage case body and the cover are closed relative to each other.

Preferably, the stepped portion is formed on the bottom wall forward end of the storage case body except a portion where corner portion of a shutter of a disk cartridge passes when the disk cartridge is inserted. Accordingly, when a disk cartridge is inserted into the disk cartridge storage case, the corner portion of a shutter of the disk cartridge does not contact with the stepped portion so that the disk cartridge can be inserted smoothly.

In addition, the foregoing object of the first, second and third aspects of the present invention can be achieved by a disk cartridge storage case in which a box-shaped body having a disk cartridge storage space and a disk cartridge insertion port communicating with the storage space is constituted by a storage case body and a cover openably/closably provided on the storage case body, the disk cartridge storage case comprising:
a stopper means for locking the cover on the storage case body in the closed state.

In the above-mentioned construction, the stopper means may comprising:

lock portions formed on the case body; and
stopper members provided on the cover which are brought in engagement with the lock portions, wherein the stopper members includes,
lock claws protruded toward outside the case body for being engaged with the lock portion,
a release pressing portions urged by a pressing force for releasing the engagement between the lock claws and the lock portion, and
a disk cartridge holding portion for holding the disk cartridge in the storage space by being engaged with the disk cartridge,
wherein when the disk cartridge is not stored in the storage space, the engagement between the lock claws and the lock portion can be released by pressing to urge the release pressing portions, and when the disk cartridge is stored in the storage space, the release pressing portions are prevented from being pressed by abutting the stopper member with the disk cartridge so that the storage case body and the cover is kept maintained in the state of closure.

In addition, in the above-mentioned construction, wherein an index sheet may fixedly held between the cover and the storage case body when the storage case body and the cover are closed relative to each other.

Further, in the above-mentioned construction, wherein the stopper members are provided with a stroke restricting means for restricting the amount of movement of the release pressing portions.

Namely, according to the construction, the opening of the storage case body and the cover enables the index sheet to be disposed easily in the storage space, and the closing of the storage case body and the cover enables the index sheet to be fixedly held to prevent the sheet from coming off easily. Further, when the disk cartridge is charged into the storage case, the storage case body and the cover can not be opened, thus ensuring that the disk cartridge is kept stored in the storage case.

In the above-mentioned construction, it is preferable for the stopper members to have a stroke restricting moans which restricts the amount of movement of the release pressing portions. According to the foregoing construction, the amount of push-in of the release pressing portions can be restricted, so that it is not necessary to adjust the pushing power of a finger when pressing the release pressing portions by finger to prevent the stopper members from being damaged, thus contributing to ease of handling.

It is an object of a third aspect of the present invention to solve the foregoing problem, and particularly it is an object of the present invention to provide a disk cartridge storage case in which an index sheet can be disposed in the storage case easily, and can be prevented from easily coming off from the storage case.

The above-mentioned object can be accomplished by a disk cartridge storage case in which a box-shaped body having a disk cartridge storage space and a disk cartridge insertion port communicating with the storage space is constituted by a storage case body and a cover openably/closably provided on the storage case body, the disk cartridge storage case comprising:

an index sheet placed in the storage space and fixedly held by closing the storage case body and the cover thereof,
wherein the rotation axis of the cover relative to the storage case body is set at a position where a distance between the rotation axis and an end of the cover which is located on the insertion port side is made shorter than a distance between the rotation axis and the bottom wall of the cartridge storage case.

Namely, in the foregoing construction, opening the storage case body and the cover enables the index sheet to be placed inside the storage space with ease. Furthermore, inasmuch as the end on the insertion port side of the cover will not interfere with the inner wall side of the case body at the time of opening the cover, the cover can be opened to the desired angle with certainty, whereafter said index sheet is fixedly held by closing the storage case body and the cover, thereby preventing the sheet from coming off easily.

Hence, it is an object of a fourth aspect of the present invention to solve the problem mentioned above, and particularly it is an object of the fourth aspect of the present invention to provide a disk cartridge storage case in which the storage of the cartridge into the storage case can be accomplished with certainty and ease, and superior handling ability can be maintained, so that damage, etc. to the cartridge to be stored or the cartridge storage case it self can be prevented with certainty.

The object can be achieved by a cartridge storage case detachably storing a cartridge with a built-in disk-like recording medium, according to the fourth aspect of the present invention, which comprises:

a storage portion which can store and hold the cartridge, and an insertion port through which the cartridge can be inserted in the storage portion and from which the cartridge can be detached, wherein a dimension of the disk cartridge insertion port in the longitudinal direction is set so that a gap defined between the insertion port and the cartridge to be stored in the storage portion is not less than 14/10,000 times and not more than 100/10,000 times as large as a dimension of the cartridge in the longitudinal direction of the insertion port.

In the cartridge storage case according to the present invention, the dimension of the insertion port in the longitudinal direction is set so that a gap with the cartridge to be stored in the storage portion is not less than 14/10,000 times and not more than 100/10,000 times. In addition, it is preferable for the lower limit thereof to exceed 40/10,000 times.

If the gap is less than 14/10,000 times as large as a dimension of the cartridge, the gap becomes too narrow to smoothly insert the cartridge, so that it becomes difficult to insert the cartridge into the cartridge storage case. This makes the handling ability lower.

If the gap is not less than 100/10,000 times as large as the dimension of the cartridge in the longitudinal direction of the insertion port, as described above, generation of the cartridge in insertion getting caught becomes significant. Further, damage of lock members tends to occur easily in the MD cartridge storage case.

In view of the aforementioned problem, it is an object of the fifth aspect of the present invention to improve the durability of part of the index card, listing the recording content in the MD, etc., in the vicinity of the end portion of the index card which is located on the insertion port side of the case when the index card is inserted detachably through the insertion port.

The above object of the fifth aspect of the present invention can be achieved by an index card to be stored in a cartridge storage case designed for storing a cartridge with a built-in disk-like recording medium in an storage portion thereof through an insertion port, the index card comprises:

a card body to be inserted in a preset direction through the insertion port into the storage portion of the cartridge storage case, and a folded part which is formed by bending an end part of the card body toward the end of the opposite side to the insertion port and has a predetermined length along the longitudinal direction of the card body.

In the above-mentioned construction, the predetermined length may be set at approximately one-third of the length of the cartridge to be stored in the cartridge storage case in an insertion direction.

In the case where the cartridge and the index card are stored in preset positions of the cartridge storage cases the forward edge of the folded part is preferably positioned between a spine portion side and an end edge of the shutter of cartridge which is located on the insertion port side of the storage case, when the shutter provided on the cartridge is in the state of closure.

In the index card according to the present invention, the folded part having the predetermined length along the longitudinal direction of the card body is provided so that the end on the insertion port side of the card body is bent into the shape of two bent portions facing the end on the opposite side to the insertion port.

In addition, in the index card according to the present invention, the folded part having the preset length along the longitudinal direction of the card body is provided so that the end on the insertion port side of the card body is bent into the shape of two bent portions facing the end on the opposite side to the insertion port. In the case where the above-mentioned cartridge and the index card are stored in preset positions of the cartridge storage case, the forward edge of the folded part is preferably positioned on the spine portion side instead of on the shutter side end of the insertion port side on the storage case side when the shutter provided on the cartridge is in the state of closure.

DETAILED DESCRIPTION OF THE PREFERRED EMBODIMENTS

An embodiment of a disk cartridge storage case based on the present invention will be described below in detail with reference to the accompanying drawings.

Figure 4:
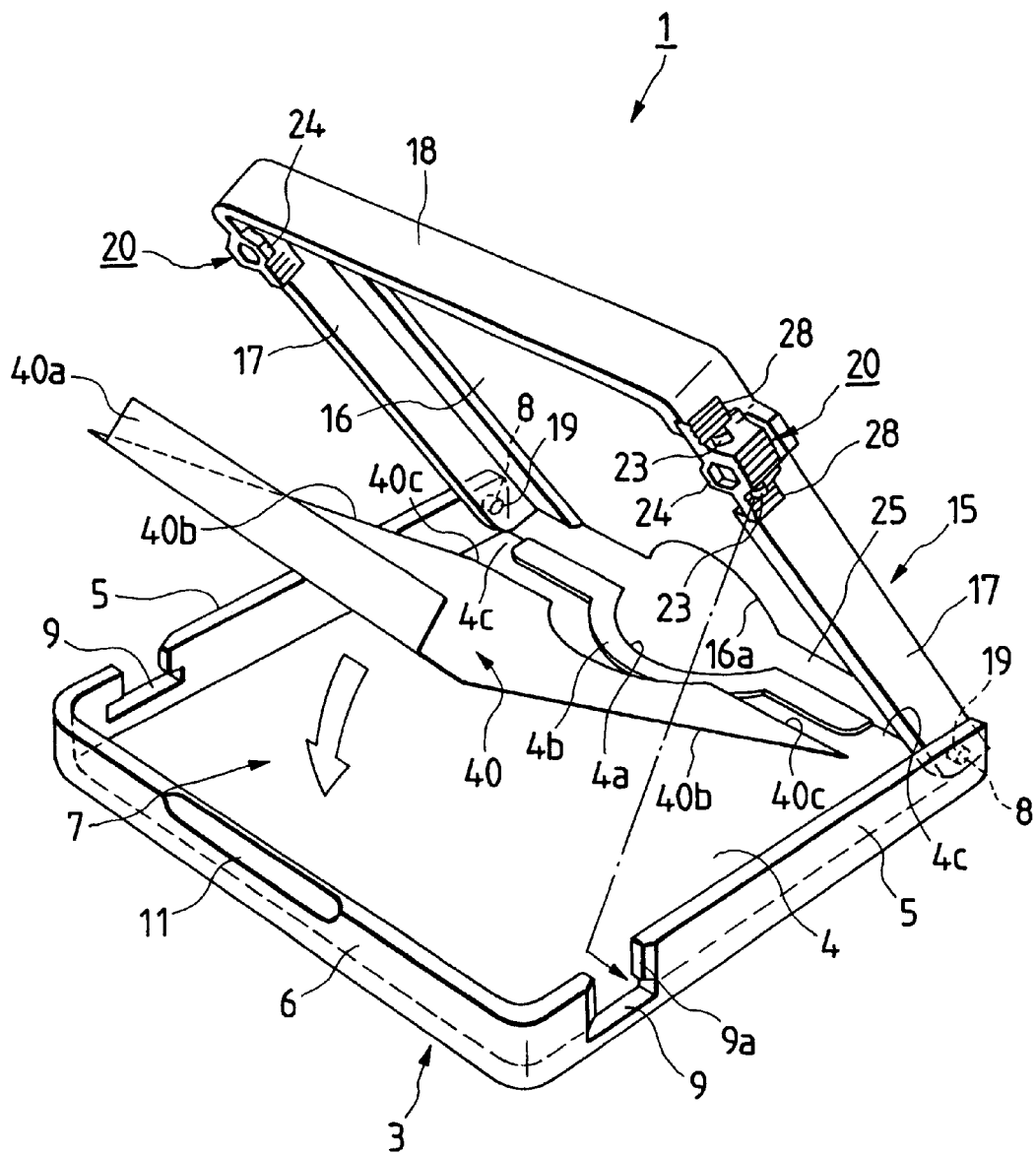
FIG. 4 is a whole perspective view in which an MD cartridge storage case according to a first embodiment of the present invention is in an opened state.
Figure 5A:
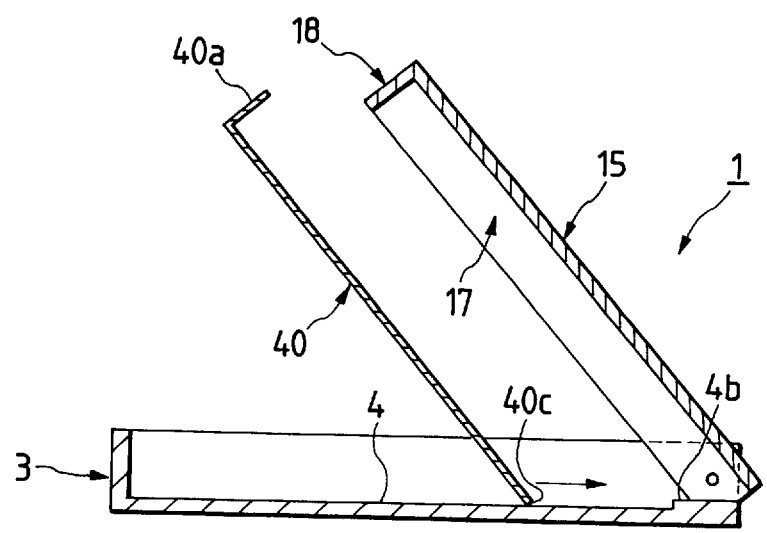
FIGS. 5(a)–5(c) are an explanatory diagram when an index sheet is disposed in the MD cartridge storage case shown in FIG. 4.
Figure 5B:
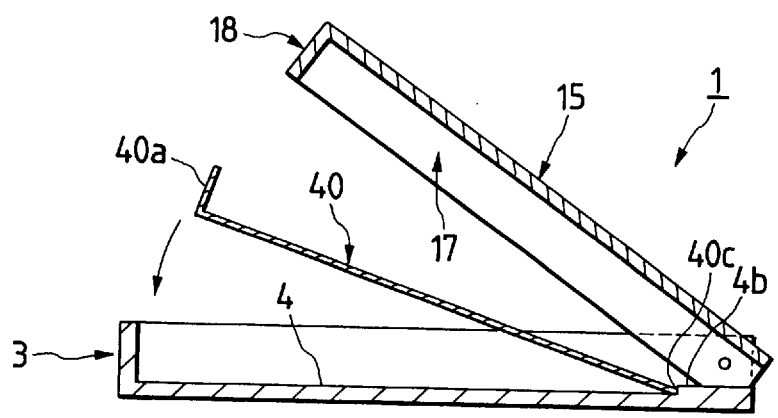
Figure 5C:
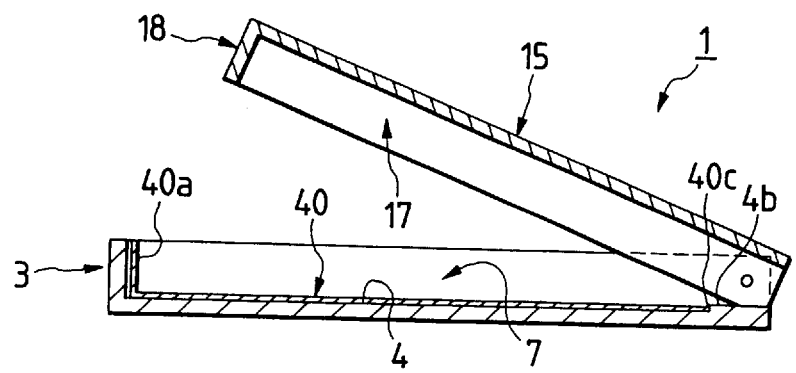

FIG. 4 is a whole perspective view in which an MD cartridge storage case according to a first embodiment of the present invention in a state where the case is opened, FIGS. 5(a)–5(c) are an explanatory diagram when an index sheet is disposed in the MD cartridge storage case of FIG. 4. FIGS. 5(a)–5(b) are a whole perspective view in which the MD cartridge storage case shown of FIG. 4 is in the closed state.

Figure 6A:
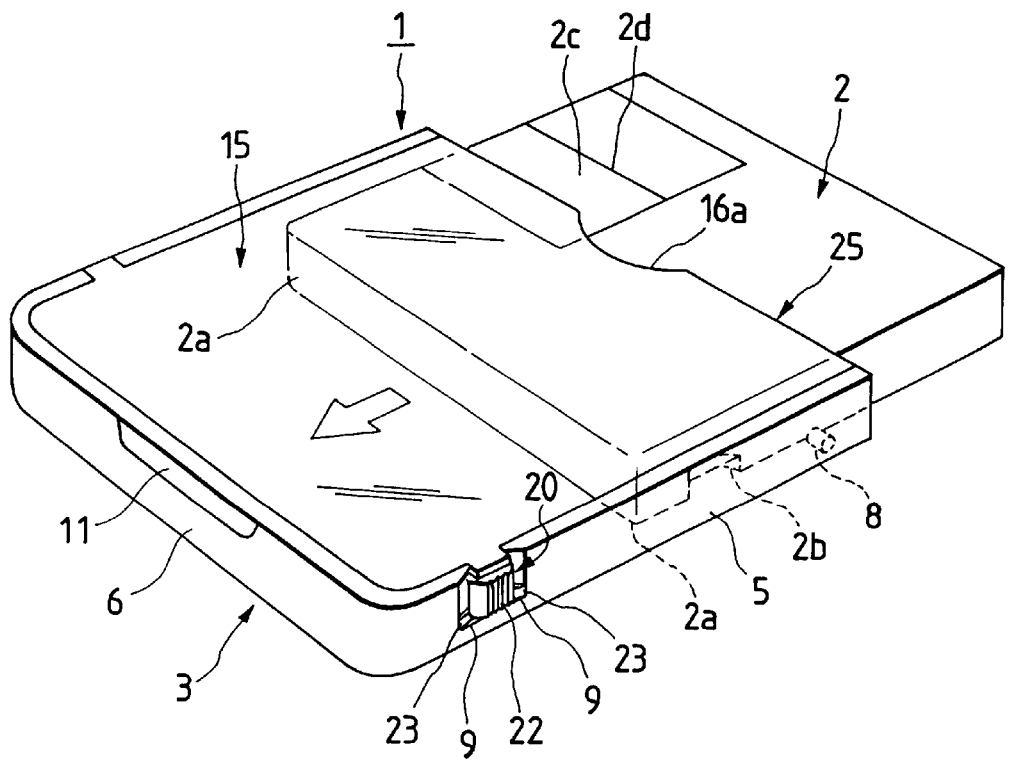
FIGS. 6(a) and 6(b) are a whole perspective view in which the MD cartridge storage case shown in FIG. 4 is in a closed state.
Figure 6B:
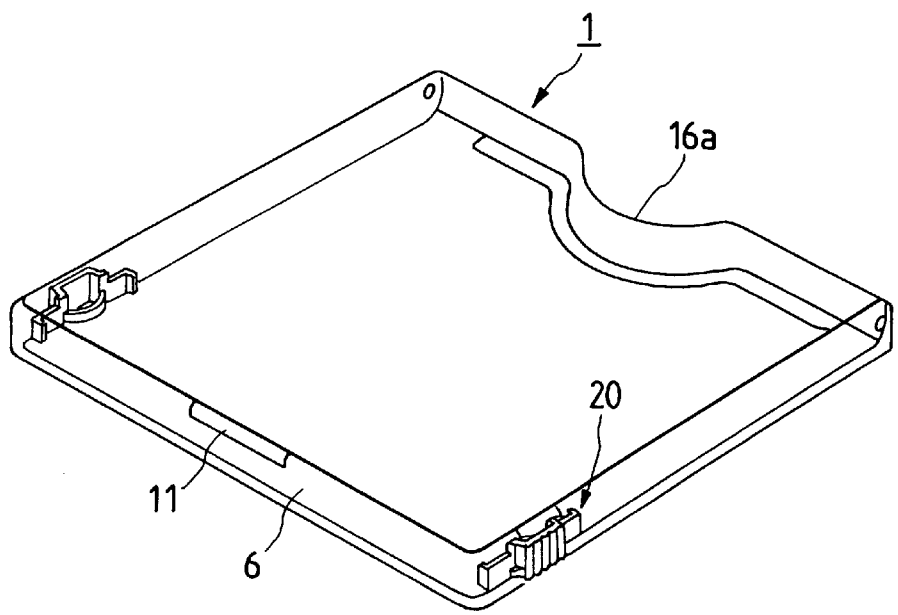

As shown in FIG. 4, an MD cartridge storage case 1 for storing an MD cartridge 2 (see FIGS. 6(a) and 6(b)) is a thin parallelepiped box which is constituted by a storage case body 3 and a cover 15 openably/closably provided on the storage case body 3.

In the storage case body 3, a cartridge storage space 7 for storing therein a disk cartridge is defined, with its top portion opened, by a bottom wall portion 4, case side-wall portions 5 and 5 provided so as to stand upright at the opposite side edges of the bottom wall portion 4, and a case rear-wall portion 6 provided so as to stand upright at the rear edge of the bottom wall portion 4. The bottom wall portion 4 has a curved recess portion 4a formed at its front edge.

In the bottom wall portion 4 in which the curved recess portion 4a is formed, a stepped portion 4b is formed along the front edge of the bottom wall 4. When the forward end of an index sheet 40 inserted into the storage case body contacts with this stepped portion 4b, the stepped portion 4b disposes the index sheet 40 in position in the cartridge storage space 7. Though depending on the thickness of paper used for the index sheet, the height (h) of the stepped portion 4b is preferably set to satisfy the condition of 0.05 mm≦h≦0.6 mm, more preferably 0.1 mm≦h≦0.5 mm, and most preferably 0.15 mm≦h≦0.4 mm. Generally, the thickness of the paper is selected to be in a range of from 0.1 mm to 0.25 mm. Accordingly, if the height h is made to be less than 0.05 mm the stepped portion 4b cannot carry out the positioning function, while if the height h is made to be more than 0.6 mm the size of the structure of the case per se must be enlarged correspondingly. Further, the stepped portion may be chamfered.

Since the stepped portion 4b is formed on the front edge of the bottom wall portion 4 except opposite end portions 4c and 4c of the front edge of the bottom wall portion 4, there is no fear that a corner portion 2d (see FIG. 6) of a shutter 2c is caught by the stepped portion 4b so that smooth insertion/ejection of the MD cartridge 2 is prevented when the MD cartridge is inserted/ejected into/from the MD cartridge storage case 1. The length of each of the opposite end portions 4c may be desirably set at a suitable value within a range in which the corner portion 2d is not interfered.

Tho cartridge storage space 7 is made be almost equal to the MD cartridge 2. Rotation shafts 8 are provided on the inner surfaces of the front end portions of the cave side-wall portions 5 and 5 respectively, and lock portions 9 and 9 are formed in the inner surfaces of the rear end portions of the case side-wall portions 5 and 5 respectively. The case rear-wall portion 6 has a recess portion 11 which is recessed so as The cover 15 is formed from transparent resin so as to have an upper wall portion 16 which covers the upper portion of the storage case body 3, cover side-wall portions 17 and 17 which are provided to stand upright at the opposite aide edges of the upper wall portion 16 so as to come on the inside of the case side-wall portions 5 and 5, and a cover rear-wall portion 18 which is provided to stand upright at the rear edge of the upper wall portion 16 so as to be disposed on the inside of the case rear-wall portion 6. A curved recess portion 16a is formed at the front edge of the upper wall portion 16.

The cover side-wall portions 17 and 17 have holes 19 and 19 to which the rotation shafts 8 and 8 of the case side-wall portions 5 and 5 are inserted, and stopper members 20 for locking the cover 15 on the storage case body in the closed state to thereby hold the MD cartridge in the storage space.

Each stopper member 20 has a release lug 22 formed on its surface, look claws 23 and 23 formed on the opposite sides of the release lug 22, an MD cartridge holding portion 24 formed on its back, and elastic portions 28 and 28 which can be transformed elastically in the direction of operation of the stopper member 20.

Next, the case where the index sheet 40 is stored in the MD cartridge storage case 1 will be described below, First, when a forward end 40c of the index sheet 40 contacts with the bottom wall portion 4 of the storage case body 3 as shown in FIG. 5(a), the forward end 4c of the index sheet 40 slides in the direction of arrow. Then, the forward end 40c of the index sheet 40 contacts with the stepped portion 4b of the bottom wall portion 4 as shown in FIG. 5(b). After that, a bent portion 40a of the index sheet 40 bent into an L-shape in section moves down to contact with the bottom wall portion 4 so that the index sheet 40 is disposed in the cartridge storage space 7 of the storage case body 3 as shown in FIG. 5(c). That is, since the forward end 40c of the index sheet 40 contacts with the stepped portion 4b so as to be disposed in position when the index sheet 40 is stored, there is no fear that the index sheet 40 slides down from the bottom wall portion 4 troublesomely.

Next, when the cover 15 shown in FIG. 4 is rotated about the rotation shafts 8 and a so as to close the case storage body 3, the lock claws 23 and 23 contact with the inner surfaces of the case side-wall portions 5 and 5, and the stopper members 20 come onto the inside of the case side-wall portions 5 and 5. In this case, the elastic portions 28 and 28 are transformed elastically into the direction of the cartridge storage space of the storage case body 3. Getting over the case side-wall portions 5 and 5, the lock claws 23 and 23 fit into the lock portions 9 and 9 shown in FIG. 6, by the urging force of the elastic portions 28 and 28 respectively. Accordingly, the cover 15 is kept in the closed state relative to the storage case body 3.

Then, the index sheet 40 is brought into the state where the bent portion 40a is held between the outer surface of the cover rear-wall portion 18 and the inner surface of the case rear-wall portion 6, and the opposite side portions 40b and 40b are hold between the cover side-well portions 17 and 17 and the bottom wall portion 4 of the storage case body 3. Accordingly, the index sheet 40 is held in the cartridge storage space 7.

Next, the case where the MD cartridge 2 is stored in the MD cartridge storage case 1 will be described.

As shown in FIG. 6, the MD cartridge 2 is inserted into the cartridge storage space 7 through the insertion port 25 in the state where the cover 15 is closed relative to the storage case body 3. The forward end corner portions 2a and 2a of the inserted MD cartridge 2 contact with the MD cartridge holding portions 24 (see FIG. 4), so as to push the MD cartridge holding portions 24 toward the outside.

Here, since the stopped portion 4b of the bottom wall portion 4 is formed on the front edge of the bottom wall portion 4 except its opposite end portions 4c and 4c (see FIG. 4), there is no fear that the stepped portion 4b interferes with passage of the corner portion 2d of the shutter 2c when the MD cartridge 2 is inserted into the MD cartridge storage case 1.

When the MD cartridge 2 is further inserted from this position, the MD cartridge holding portions 24 enter the recess portions 2b and 2b (only one of which is illustrated) formed on the forward end opposite side portions of the MD cartridge 2. Accordingly, the MD cartridge 2 is held so as not to come off from the cartridge storage space 7.

By the fitting of the MD cartridge holding portions 24 into the recess portions 2b and 2b of the MD cartridge 2 in such a manner, the stopper members 20 are fixed at the same time. Therefore, the release lugs 22 of the stopper members 20 cannot be pushed in even if one pushes them by fingers. Consequently, there is no fear that the cover 15 is opened from the storage case body 3 so long as the inserted MD cartridge 2 is in the MD cartridge storage case 1.

Next, an MD cartridge storage case according to a second embodiment of the present invention shown in FIG. 7 will be described below.

Figure 7:
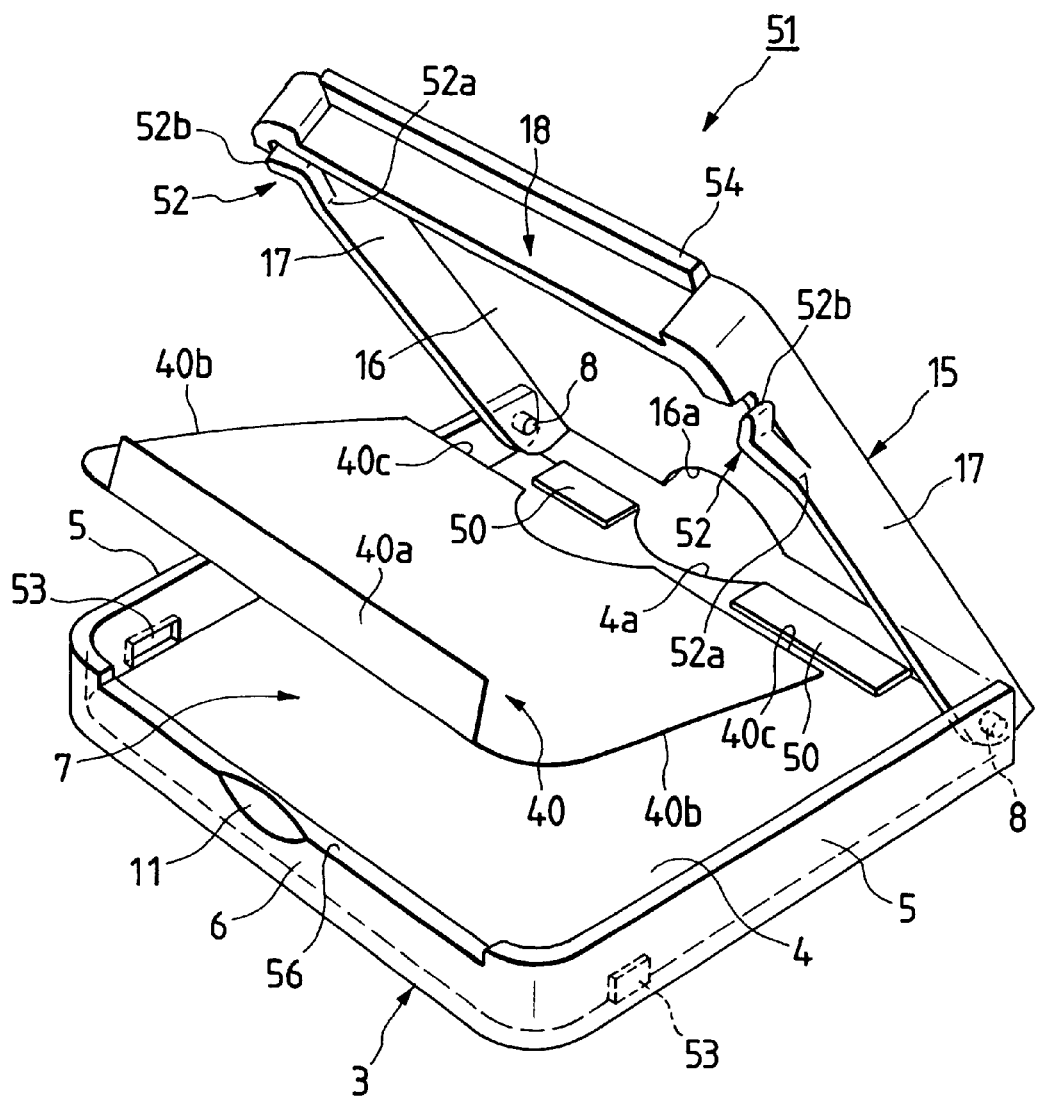
FIG. 7 is a whole perspective view in which an MD cartridge storage case according to a second embodiment of the present invention is in an opened state.

Although the case where the stepped portion 4b is formed along the front edge including the curved recess portion 4a of the bottom wall portion 4 was described in the above first embodiment, stepped portions 50 and 50 may be formed on the front edge portions of the bottom wall portion 4 other than the recess portion 4a thereof as shown in FIG. 7 illustrating a second embodiment.

Also in this embodiment, the forward end portion 40c of the index sheet 40 can contact with the stepped portions 50 in the same manner as in the first embodiment, so that it is possible to dispose the index Sheet 40 in the cartridge storage space 7 easily.

The configuration of an MD cartridge storage case 51 will be described below with reference to FIG. 7. In FIG. 7, constituent members the same as those in the first embodiment are referenced correspondingly, and description about them is therefore omitted.

The MD cartridge storage case 51 has approximately L-shaped lock claws 52 and 52 formed so that each bent portion of the L-shape projects inside. Base end portions 52a and 52a of the respective lock claws 52 and 52 are integrally connected to the cover side-walls 17 and 17. Forward end portions 52b and 52b of the lock claws 52 and 52 can engage with locking recess portions 53 and 53 of the case side-wall portions 5 and 5.

Next, the operation of the MD cartridge storage case 51 will be described below.

As mentioned above, the cover 15 is closed after the forward end portion 40c of the index sheet 40 is brought into contact with the stepped portions 50 to thereby dispose the index sheet 40 in position in the cartridge storage space 7. When the MD cartridge 2 is not stored in the cartridge storage space 7 in this state, the forward end portions 52b and 52b of the lock claws 52 and 52 fit into the locking recess portions 53 and 53 shallowly. Therefore, if one puts his/her fingers on the recess portion 11 of the case rear-wall portion 6 and a finger-hooking protrusion strip 54 of the cover rear-wall portion 18 so as to pull the finger-hooking protrusion strip 54 upward, one can open the cover 15 easily. A fitting recess portion 56 to which the finger-hooking protrusion strip 54 is to be fitted is formed in the upper edge of the case rear-wall portion 6.

On the other hand, when the MD cartridge 2 is stored in the cartridge storage space 7, the lock claws 52 and 52 are pushed outward by the recess portions 2b and 2b of the MD cartridge 2, so that the forward end portions 52b and 52b of the lock claws 52 and 52 fit into the locking recess portions 53 and 53 deeply, Therefore, even if one puts his/her fingers on the recess portion 11 of the case rear-wall portion 6 and the finger-hooking protrusion strip 54 of the cover rear-wall portion 18 so as to pull the finger-hooking protrusion strip 54 upward, one cannot open the cover 15.

The disk cartridge storage case according to the present invention is not limited to such MD cartridge storage cases illustrated in the above-mentioned respective embodiments, and, not to say, it is applicable to storage cases for other disk cartridges such as a 3.5-inch floppy disk, an optical disk, and so on. In addition, the shapes of the cover and the storage case body, and the shapes of the stopper member 20, the elastic lock portion 52, the lock portion 9 and the locking recess portion 53 are not limited to the shapes of the cover 15 and the storage case body 3 in the above-mentioned embodiments, and, not to say, they can be modified in various forms.

As has been described above, in the disk cartridge storage case according to the present invention, a stepped portion is provided at the front edge of a bottom wall portion of a storage case body for positioning an index sheet inserted into the storage case body in a predetermined position, so that it is possible to dispose the index sheet in a storage space easily when a cover of the storage case body is opened. In addition, when the cover of the storage case body is closed, it is possible to fixedly hold the index sheet to thereby easily prevent the index sheet from coming off.

Accordingly, it is possible to provide a superior disk cartridge storage case in which not only an index sheet can be disposed in the storage case easily, but also the index sheet can be prevented from easily coming off therefrom.

Figure 8:
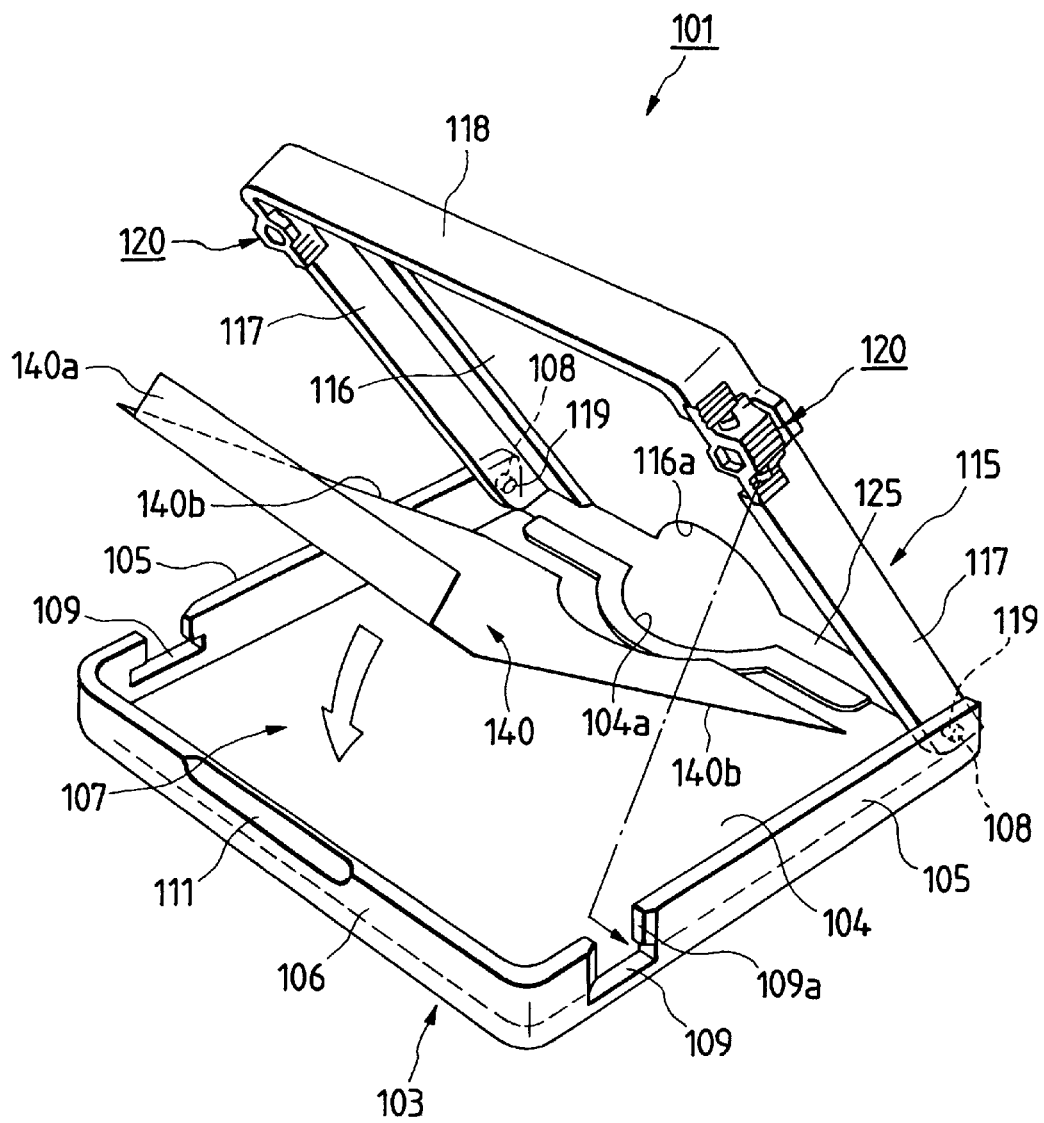
FIG. 8 is a whole perspective view of a third embodiment of the MD cartridge storage case according to the present invention in an open state.
Figure 9:
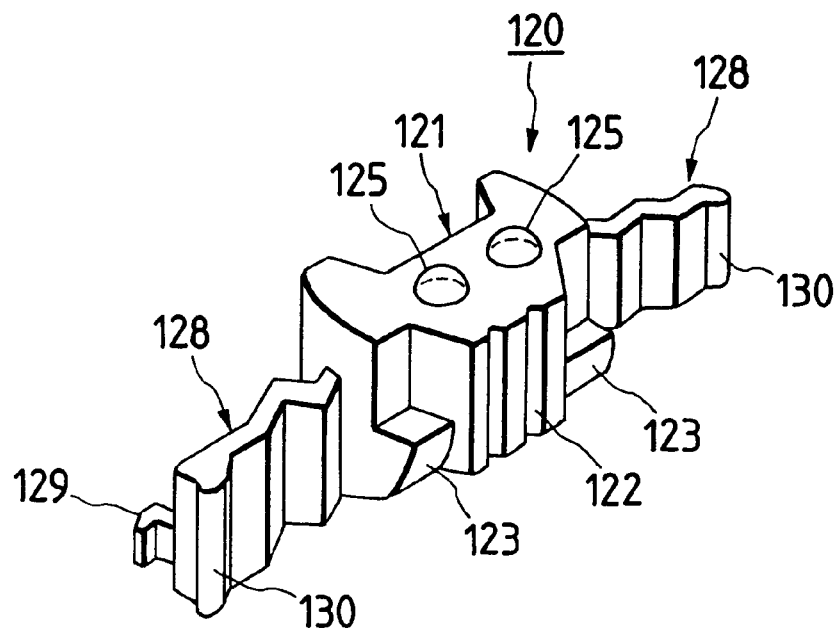
FIG. 9 is a perspective view of a stopper member shown in FIG. 8 as seen from the front side.
Figure 10:
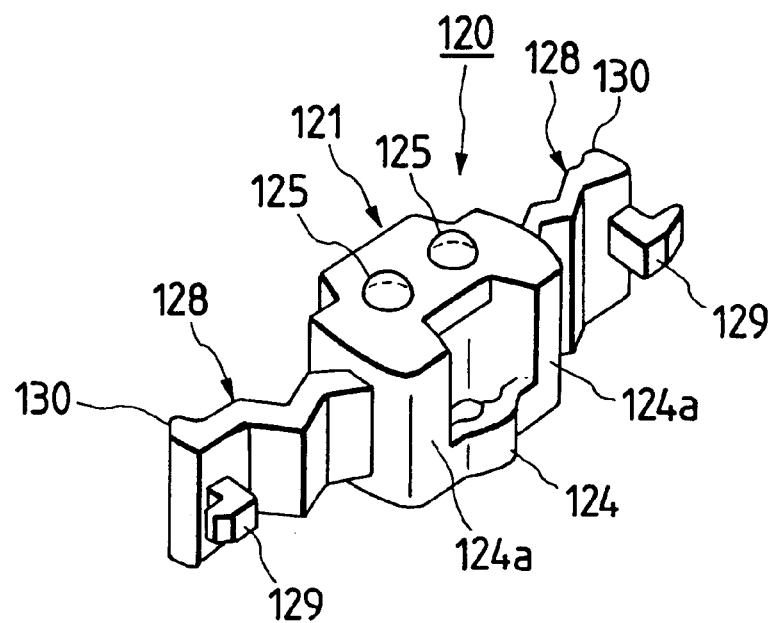
FIG. 10 is a perspective view of the stopper member shown in FIG. 8 as seen from the back side.

Referring to the accompanying drawings, a third embodiment of a disk cartridge storage case according to the present invention will be described below in detail. FIG. 8 is a whole perspective view of an MD cartridge storage case in an open state based on the fourth embodiment according to the present invention, FIG. 9 is a perspective view of a stopper member shown in FIG. 8 as seen from the front side, and FIG. 10 is a perspective view of the stopper member shown in FIG. 8 as seen from the back side.

As shown in FIG. 8, the MD cartridge case 101 storing the MD cartridge 102 (see FIG. 15) includes a box-shaped body comprising a storage case body 103 and a cover 115 which is provided openably/closably on the storage case body 103 and is formed of a thin parallelpiped. The box-shaped body defines a cartridge storage space 107 which is a storage space for storing the disk cartridge with an open top thereof and which is made up of a bottom wall portion 104 with a curved recess 104a formed on the forward end thereof as well as case side wall portions 10 and 105 provided upright on the ends of both sides and the rear end of the bottom wall portion 104 and a case rear wall portion 106 which serve as a case peripheral part.

The cartridge storage space 107 is approximately equal in size to the MD cartridge 102. The case side wall portions 105 and 105 have the inner surfaces of the forward ends wherein rotary shafts 108 are coaxially protruded, with the formation of lock portions 109 and 109 on the inner surfaces of the rear ends. The case rear wall portion 106 is provided with a recess 111 so as to be caught by finger easily.

As shown in FIG. 8, the lock portions 109 are made up of openings formed at the rear ends of the case side wall portions 105 and lock projections 109a formed on both edges of the openings, so that lock claws 123 is brought in engagement with the lock projections 109a.

The cover 115 is made of transparent resin. The cover 115 includes an upper wall portion 116 covering the top of the storage case body 103, cover side wall portions 117 and 117 and a cover rear wall portion 11 which are provided upright on ends of both sides and a rear end of the upper wall portion 116 and closely fit inside the case side wall portions 105 and 105 and the case rear wall portion 106. On the forward end of the upper wall portion 116 is formed a curved recess 116a.

The cover side wall portions 117 and 117 are provided with slots 119 and 119, into which rotary shafts 108 and 108 of the case side wall portion 105 and 105 are inserted, and lock portions 109 and 109 to be in engagement with stopper members 120 for engaging the cover 115 in the state of closure relative to the storage case body 103 and keeping the MD cartridge in the storage space.

The cover 115 is supported pivotally with respect to the storage case body 103 about the rotary shafts 108 and 108, and an insertion port 125 of the MD cartridge 102 is formed at the forward end of the MD cartridge storage case 101 by closing the cover 115 and the storage case body 103.

As shown in FIGS. 9 and 10, the stopper members 120 have blocks 121 formed in an approximately rectangular shape and elastic portions 128 and 128 on both sides of the blocks 121 which are bent like a bellows to improve mechanical strength and which are capable of elastic deformation in the direction of the cartridge storage space of the storage case body 103.

As shown in FIGS. 9 and 10, the blocks 121 include release pressing portions 122 formed on the external surfaces, lock claws 123 and 123 formed on both sides of the release pressing portions 122, MD cartridge holder portions 124 formed on the back side, and projections 125 and 125 formed on the top.

The lock claws 123 and 123 operate to engage the lock portions 109 of the case side wall portions 105 to keep the cover 115 in the state of closure relative to the storage case body 103. However, when the MD cartridge 102 is not stored in the storage space 107, the release pressing portions 122 can be pressed into the inside of the case so as to release the engagement between the lock claws 123 and 123 and the lock portions 109.

On the other hand, the MD cartridge holder portions 124, when the MD cartridge 102 is stored in the storage space 107, engages the MD cartridge 102 to keep the MD cartridge 102 in the storage space 107 and simultaneously holds the engagement of the lock claws 123 and 123 with the lock portions 109 in the locked state.

Each of the elastic portions 128 and 128 is provided with a lock pawl 129 on the inner surface of its end as well as a protrusion 130 on the outer surface thereof. Since the protrusion 130 comes into sliding contact with the inner surface of each of the case side wall portions 105, the cross-section thereof is preferably in a semi-circular shape. However, the shape thereof is not limited to this form.

Figure 11:
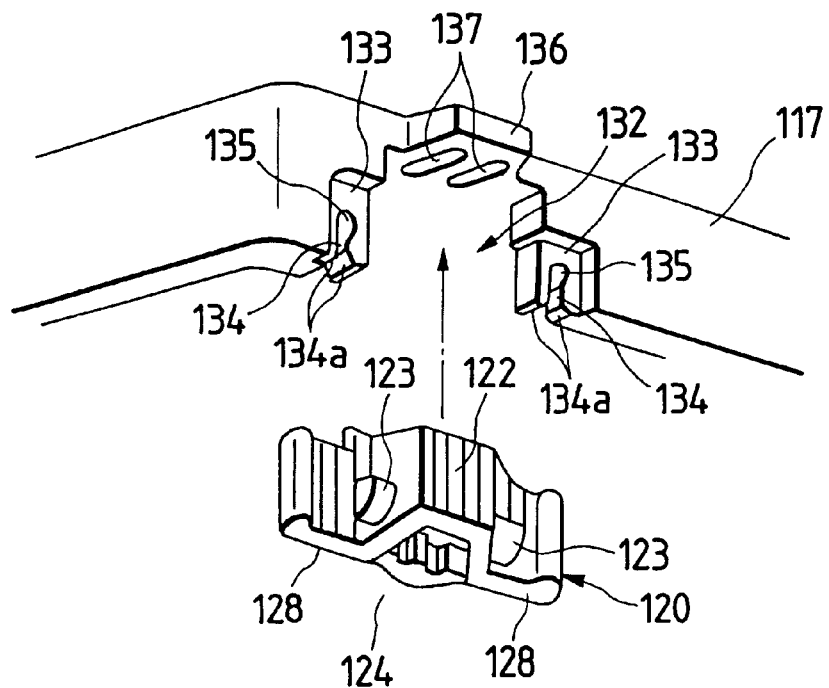
FIG. 11 is a perspective view of the stopper member in the state of being fitted to the cover shown in FIG. 8.
Figure 12:
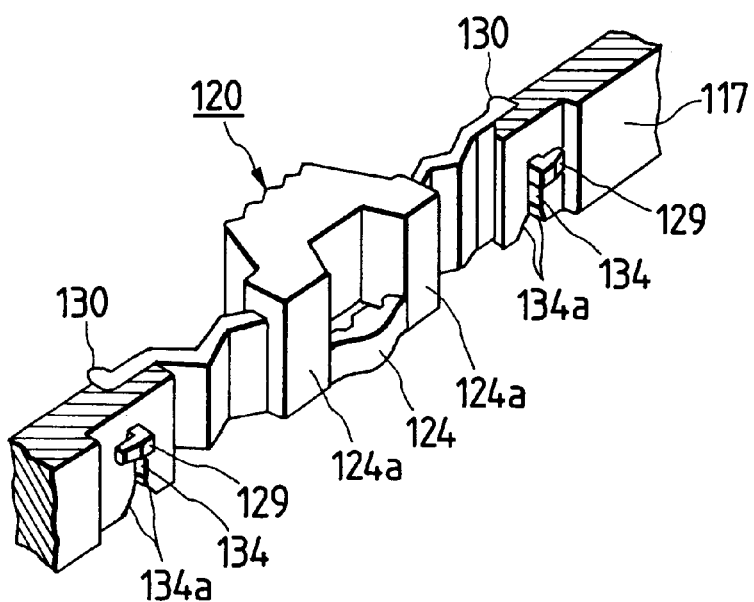
FIG. 12 is a perspective view of the stopper member which has been fitted to the cover shown in FIG. 8.
Figure 13A:
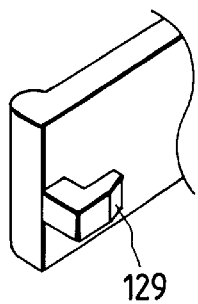
FIG. 13 is a perspective view of variation examples of an lock claws shown in FIG. 8.
Figure 13B:
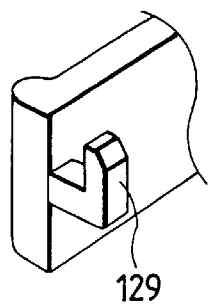
Figure 13C:
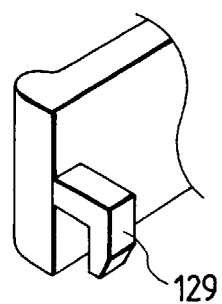

Referring to FIG. 11 through FIG. 13, description will be provided about the case where the stopper members 120 are mounted in the cover side wall portions 117.

First, the case where mounting openings 132 etc. into which the stopper members 120 are to be mounted will be described. As shown in FIG. 11, the mounting openings 132 are formed at the rear ends of the cover side wall portions 117 and stepped portions 133 are formed on both sides of the mounting openings 132. On the stopped portions 133 and 133 are formed slits 134 and 134. Holding apertures 135 and 135 are formed on the tips of the slits 134 and 134, respectively.

In addition, on the bottom of the mounting openings 132 are formed outwardly protruding pieces 136 protruding toward outside the case, and a pair of long slits 137 and 137 are formed and recessed on a surface opposite the stopper members 120 of the protruding pieces 136. The long slits 137 and 137 functions as a stroke restricting means 139 (see FIG. 16) for restricting the amount of stroke of movement of the stopper members 120, while the projections 125 and 125 of the blocks 121 are slidably inserted into the long slits 137.

In the above-mentioned embodiment, as the stroke restricting means 139, an example in which the blocks 121 are provided with projections 125 and 125 and the long slits 137 and 137 are provided on the protruding pieces 136 is described, the stroke restricting means 139 is not limited into such structure. Conversely, the provision of long slits on the blocks 121 and the provision of projections on the protruding pieces 136 are acceptable. It is also possible to construct the long slits in such a manner that the long slits extend through in the direction to outside the case so as to restrict its position only when the stopper members 120 are pushed in, that is, that the long slit is designed to only restrict the amount of push-in.

Next, as shown in FIG. 11, the stopper members 120 are inserted into the above-mentioned mounting openings 132.

Namely, the stopper members 120 are pushed in the direction of arrow to insert the lock pawls 129 and 129 on the ends of elastic portions 128 and 128 into the slits 134 respectively.

Tapered portions 134a and 134a are formed on the inlet side of the slits 134 and 134, in such a manner that the lock pawls 129 and 129 can be easily inserted.

In addition, when the lock pawls 129 and 129 are forced through the slits 134 and 134 and set inside holding slots 135 and 135, the lock pawls 129 and 129 are kept held in the cover side wall portions 117 due to snap fit as shown in FIG. 12.

Therefore, the stopper members 129 can be tightly mounted in the cover side wall portions 117.

However, in this embodiment, although the lock pawls 129 and 129 are extended so as to face outside from each other as shown in FIG. 12, the extending direction of the lock pawls 129 and 129 is not limited into this. The extending direction of the lock pawls 129 can be modified into any directions as shown in Figs. FIGS. 13(a), 13(b) and 13(b), as long as the locking operation thereof can be maintained stably. Depending on design conditions and so, any extending directions, such as a direction extending toward inside, upper side or lower side, may be employed.

Figure 14:
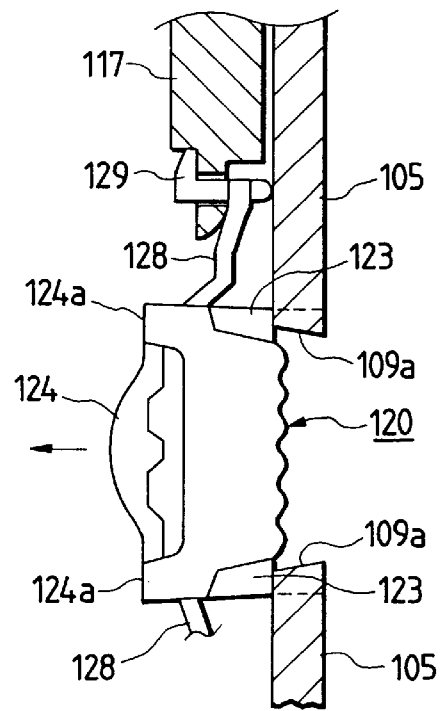
FIG. 14 is an explanatory diagram of the stopper member at the time of closing the cover shown in FIG. 8.

Next, in reference to FIG. 14 and FIG. 15, description will be made about the case where the cover 115 is closed for the index sheet 140 to be stored in the MD cartridge storage case 101.

As shown in FIG. 8, at first the index sheet 140 is placed in the cartridge storage space 107 of the storage case body 103. Upon rotation of the cover 115 about the rotary shafts 108 and 108, the cover 115 is closed relative to the storage case body 103, as shown in FIG. 14, and the lock claws 123 and 123 abut the inner surfaces of the lock projections 109a and 109a to permit stopper members 120 to enter into the case side wall portions 105 while the elastic portions 128 and 128 are in a stretched state.

Then, when the lock claws 123 and 123 get over the lock projections 109a and 109a as shown in FIG. 8, the stopper members 120 are set in the lock portions 109 and 109 to hold the cover 115 in the state of closure relative to the storage case body 103.

At this instant, as shown in FIG. 8, the bent portion 140a of the index sheet 140 is held by the cover rear wall portion 118 and the case rear wall portion 106, and both side portions 140b and 140b thereof are being held by the cover side wall portions 117 and 117 and the bottom wall portion 104 of the storage case body 103, whereby the index sheet 140 is held inside the cartridge storage space 107.

Further, the amount of overlap between the lock claws 123 and 123 and the lock portions 109 and 109 when the lock claws 123 and 123 are engaged with the lock portions 109 and 109 is set in the range of 0.1 to 0.5 mm, or preferably 0.15 to 0.4 mm.

If the amount of overlap therebetween is less than 0.1 mm, an engagement of the lock claws 123 and 123 with the lock portions 109 and 109 becomes insufficient. In addition, if the amount of overlap therebetween is more than 0.5 mm, it is rendered difficult to release the engagement between the lock claws 123 and 123 and the lock portions 109 and 109.

Next, description will be provided about the case where the cover 115 is opened for removal of the index sheet from the MD cartridge storage case 101.

First, the MD cartridge 102 is taken out of the MD cartridge storage case 101. Then, the release pressing portions 122 of the stopper members 120 are pressed by finger to evacuate the lock claws 123 and 123 from the lower edges of the lock projections 10a and 109a. In this state, the recess 111 of the case rear wall portion 106 is caught by finger to rotate the cover 115 about the rotary shafts 103 and 108, thereby opening the cover 115 from the storage case body 103. Then, the index sheet 140 can be taken out of the cartridge storage space 107.

Figure 16:
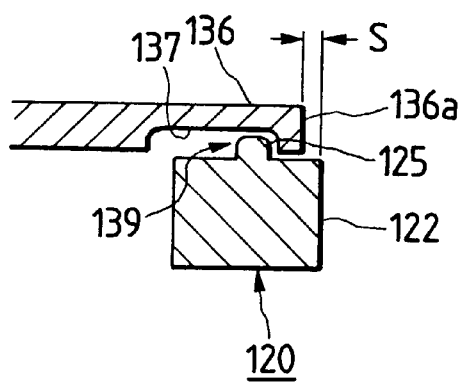
FIG. 16 is a section view of FIG. 15 along the line XVI—XVI.

At this time, as shown in FIG. 16, since the tip ends 136a of the protruding pieces 136 have entered/retract from the outer surface to inside the release pressing portions 122, it is made easy to push the release pressing portions 122 by finger. This push-in amount S is set in the range of 0.1 to 0.5 mm, preferably 0.15 to 0.4 mm. The amount 5 is to be determined according to the amount of overlap between the lock claws 123 and 123 and the lock portions 109 and 109.

Figure 17:
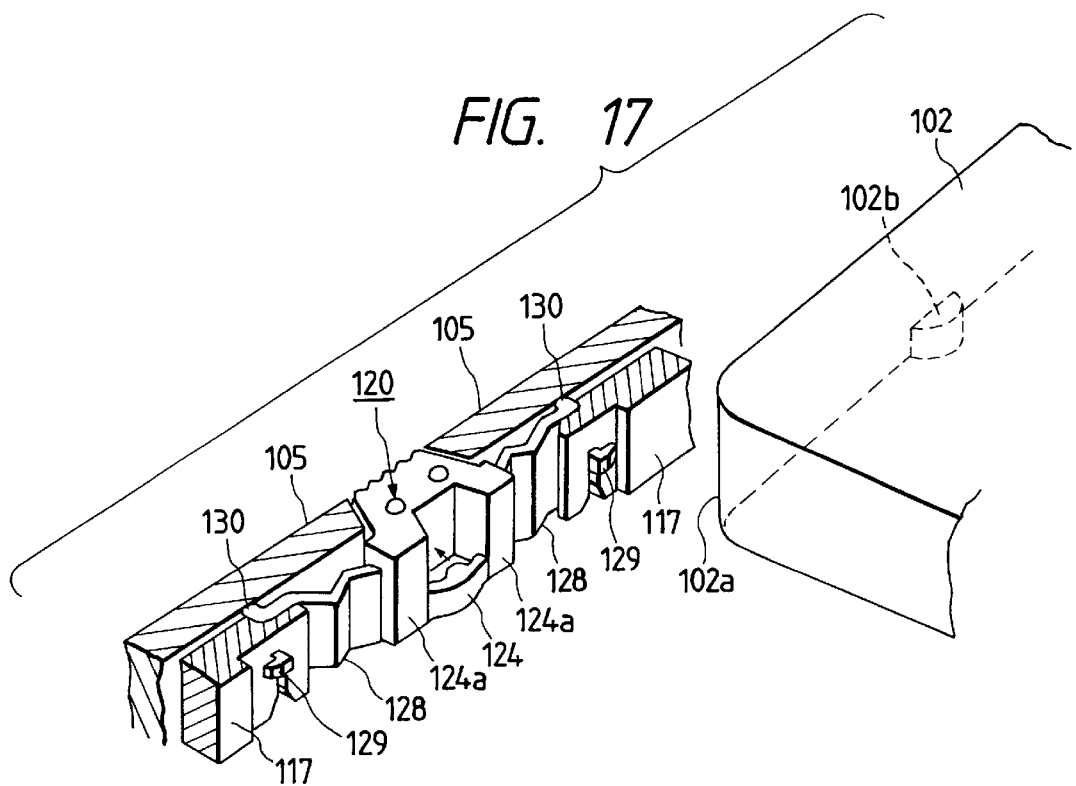
FIG. 17 is an explanatory diagram of storing the MD cartridge in the MD cartridge storage case shown in FIG. 8.
Figure 18:
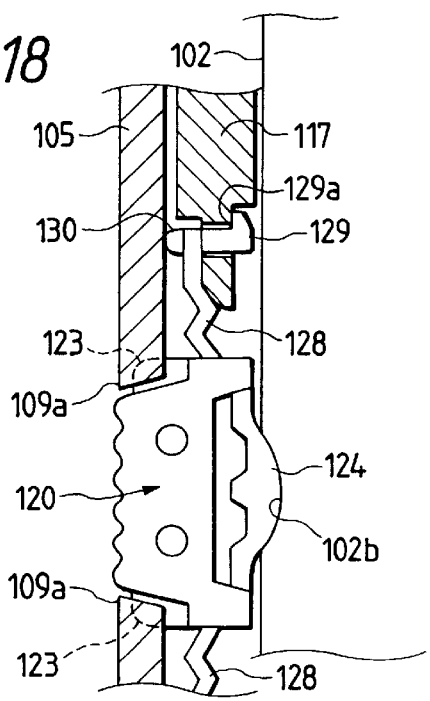
FIG. 18 is an explanatory diagram of storing the MD cartridge in the MD cartridge storage case shown in FIG. 8.

Next, description based on FIG. 15, FIG. 17 and FIG. 18 will be made about the case where the MD cartridge 02 is stored in the MD cartridge storage case 101.

Figure 15:
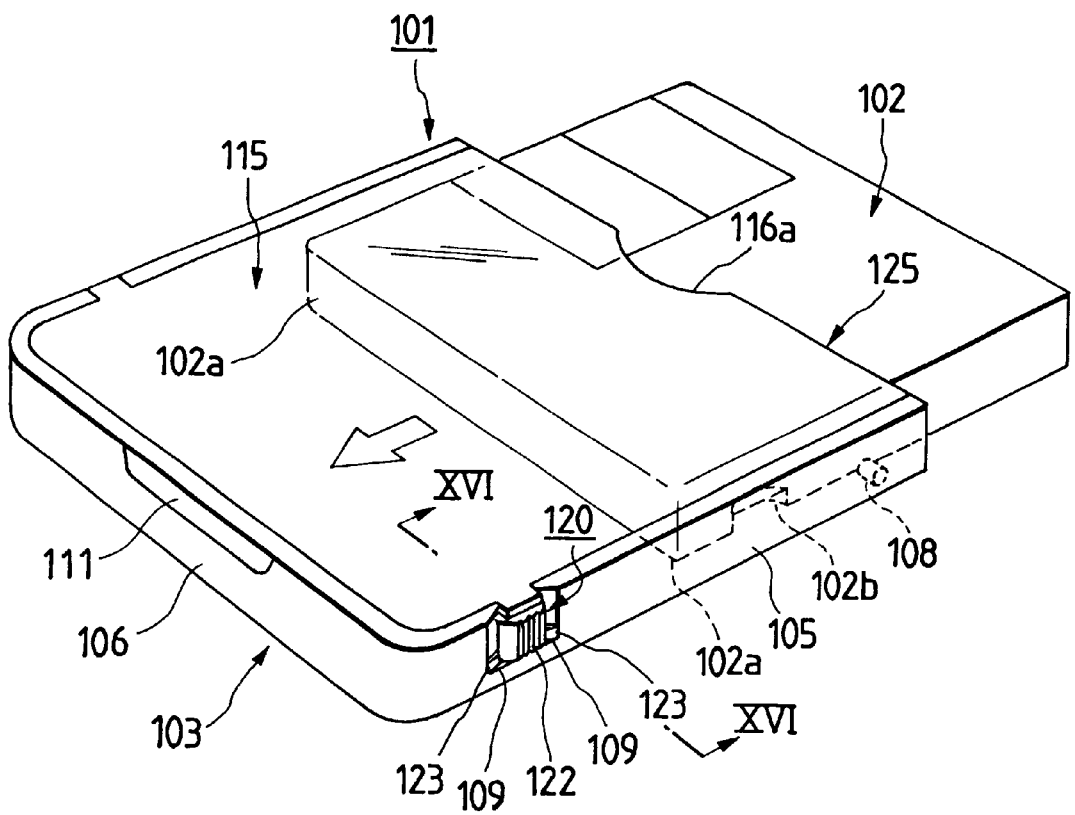
FIG. 15 is a whole perspective view of the MD cartridge storage case shown in FIG. 8 in the open state.

As shown in FIG. 15, while the cover 115 is in the state of closure relative to the storage case body 103, the MD cartridge 102 is inserted through the insertion port 125 into the cartridge storage space 107. At this time, as FIG. 17 shows, forward end round corners 102a and 102a (only one of which is illustrated herein) of the inserted MD cartridge 102 are in abutment with the MD cartridge holder portions 124 to push the portions 124 to outside the case in the direction of arrow in FIG. 17.

When the MD cartridge 102 is further inserted from this position, the MD cartridge holder portions 124 enter into (see FIG. 18) recesses 102b and 102b (only one of which is illustrated herein) formed on both sides of the forward end of the MD cartridge 102, thereby holding the MD cartridge 102 to keep the cartridge from coming off the cartridge storage space 107.

In this manner, entry of the MD cartridge holder portions 124 into the recesses 102a and 102a of the MD cartridge 102 (see FIG. 15) results in restricting the movement of the stopper members 120 into the case. Consequently, even if the release pressing portions 122 of the stopper members 120 is further pushed by finger, the release pressing portions 122 can not be moved in the pushing direction, because portions 124a of the stopper members 124 are brought in abutment with the MD cartridge 102. As a result, the lock claws 123 and 123 cannot be released from the lock portions 109, thus making it impossible for the cover 115 to be opened from the storage case body 103.

It is also noted that since the protrusions 130 and 130 protruded on the outer surface of the ends of the elastic portions 128 and 128 are in abutment with the case side wall portions 105, even when the MD cartridge holder portions 124 are pushed to outside the case (in the direction of arrow), the restrictive effect of the protrusions 130 and 130 can prevent the lock pawls 129 and 129 from being pulled to outside the case. Hence, repetition of insertion/ejection of the MD cartridge 102 does not generate a repetition stress on the bent portions 129a of the lock pawls 129, so that the lock pawls are not damaged.

The disk cartridge storage case according to the present invention is not limited to the storage case for the MD cartridge in the aforementioned fourth embodiment but is naturally applicable to other storage cases for disk cartridges such as 3.5-inch floppy disks and optical disks. Likewise, it goes without saying that the shapes of covers and storage case bodies as well as shapes of the stopper members 120 and the lock portions 109 are not limited to the shapes of the cover 115 and the storage case body 103 and that a variety of forms may be employed.

As the foregoing explanation shows, in the disk cartridge storage case of the second aspect of the present invention, the index sheet can be easily disposed in the storage space by opening the storage case body and the cover, and the index sheet can be fixedly held and prevented from coming off easily by closing the storage case body and the cover.

Consequently, it is possible to provide a disk cartridge storage case having a superior quality in which the placement of the index sheet in the storage case can be easily accomplished, while the index sheet placed in the disk cartridge storage case can be prevented from coming off easily. In addition, when the disk cartridge is charged in the storage case, the storage case body and the cover are not opened, thus ensuring that the disk cartridge is stored therein.

A fourth embodiment of a disk cartridge storage case according to the present invention will be described in detail hereunder with reference to the accompanying drawings.

Figure 19:
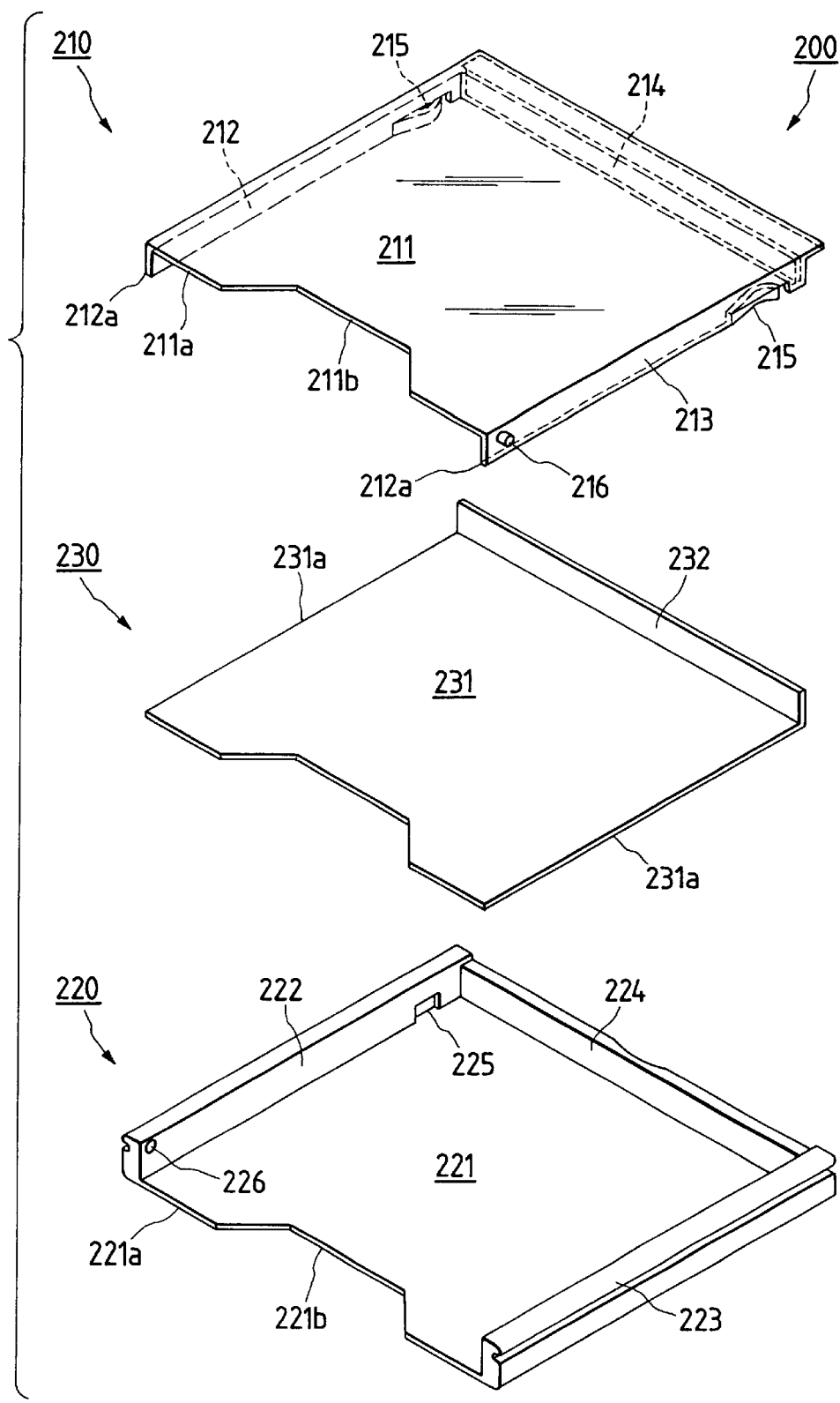
FIG. 19 is an exploded perspective view of a fourth embodiment of the MD cartridge storage case according to the present invention.
Figure 20:
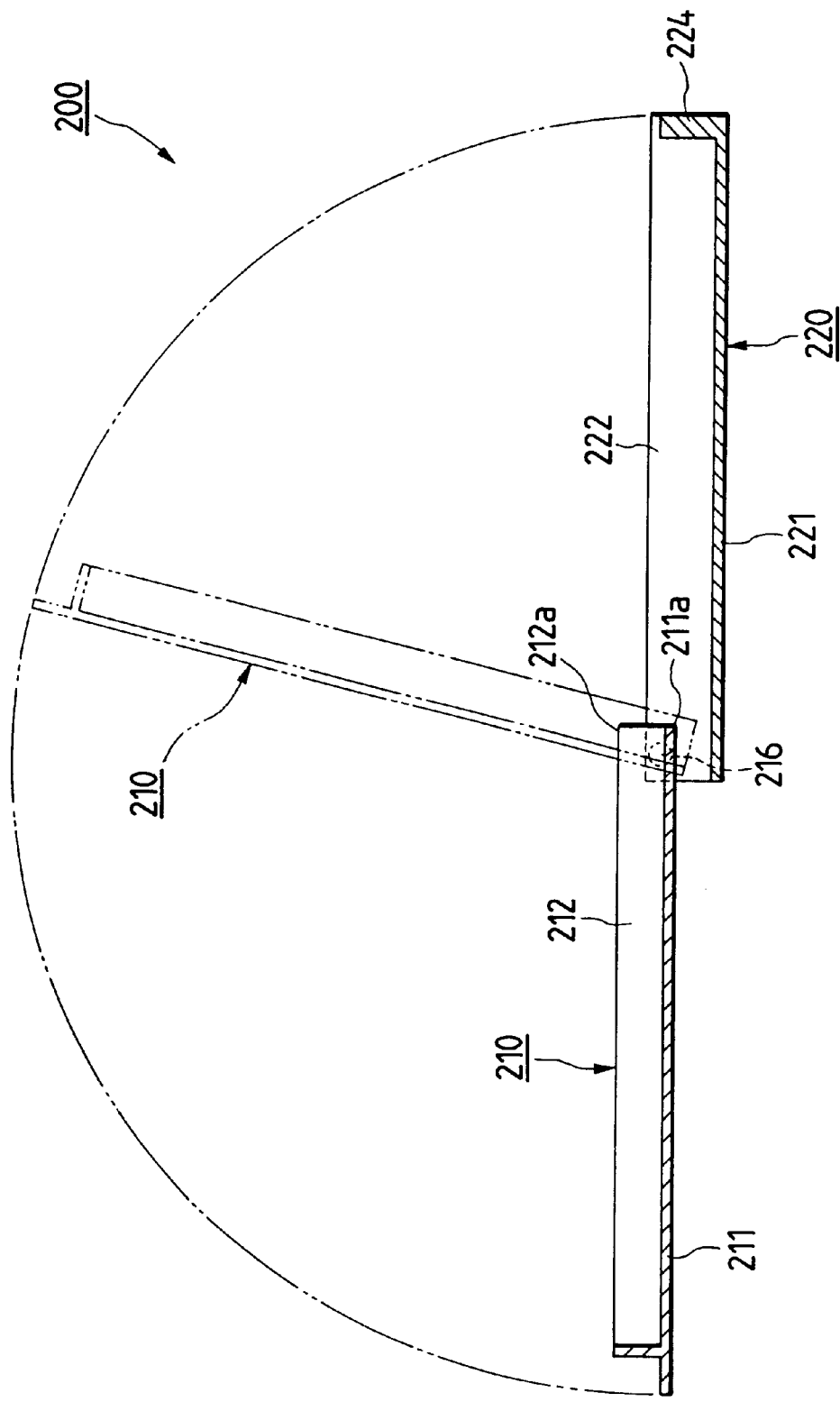
FIG. 20 is a whole longitudinal sectional view explaining the opening and closing operation of the cover shown in FIG. 19.
Figure 21:
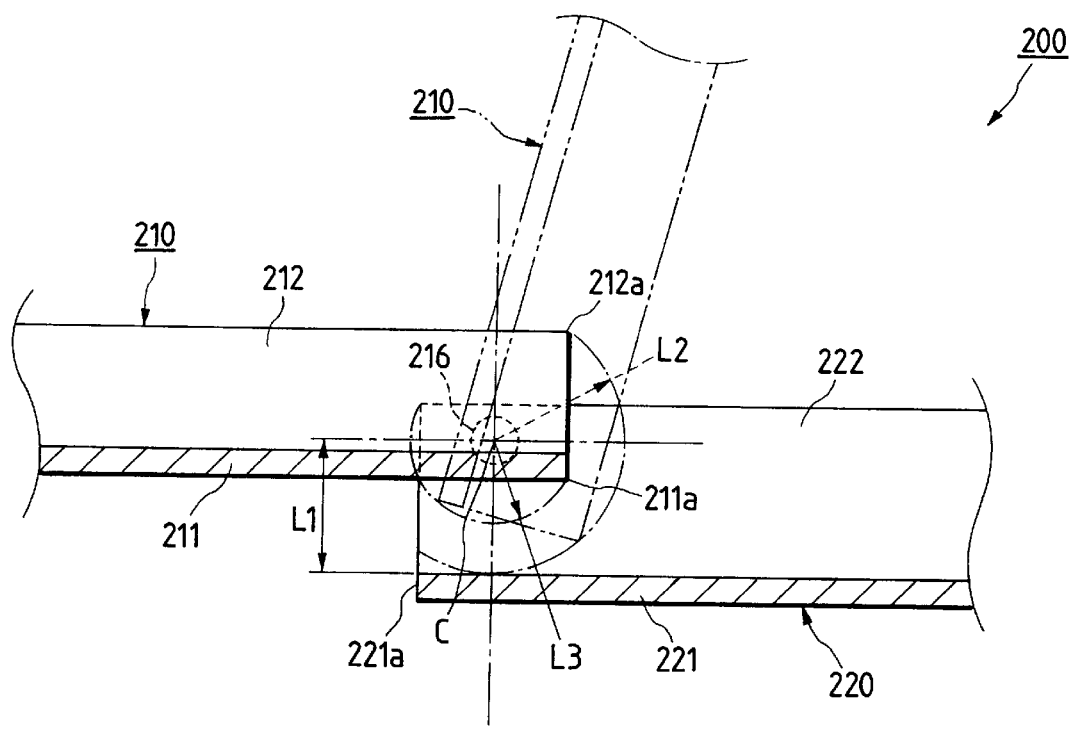
FIG. 21 is a longitudinal sectional view of an enlarged main part of FIG. 20.

FIG. 19 is an exploded perspective view, FIG. 20 is a whole longitudinal sectional view explaining the opening and closing operation of the cover shown in FIG. 19, and FIG. 21 is a longitudinal sectional view of an enlarged main part of FIG. 20.

Figure 1:
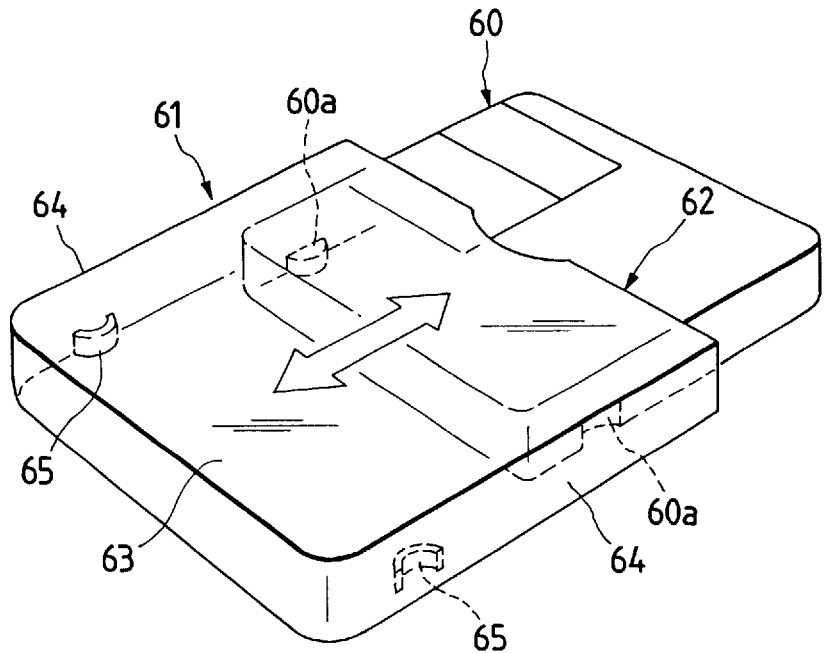
FIG. 1 is a whole perspective view of a conventional MD cartridge storage case.

As shown in FIG. 19, the MD cartridge storage case 200 is a box-shaped body made up of a storage case body 220 and a cover 210 openably/closably provided on said storage case body 220 so as to form a storage space which can store an MD cartridge 60 illustrated in FIG. 1, and an index sheet 230 listing the content of information recorded in the MD cartridge 60 can be accommodated therein.

The cover 210 is a transparent member which is formed by injection molding with resin material. The cover 210 is pivotally supported about the storage case body 220 and has an upper wall portion 211 covering the top of said storage case body 220, a pair of left and right cover side wall portions 212 and 213 provided upright on both side ends and the rear end of said upper wall portion 211 and a cover rear wall portion 214. In addition, a portion upon which these cover side wall portions 212, 213 and the cover rear wall portion 214 are not provided constitutes an insertion port for the MD cartridge 60 to be inserted into the storage space.

On the pair of the left and the right cover side wall portions 212 and 213 are respectively formed a pair of left and right elastic lock members 215 to stop the cover 210 from engaging the storage case body 220 when the cover 210 is closed with respect to the storage case body 220.

Further, on the outside of the forward ends of the pair of the left and right cover side wall portions 212 and 213, a pair of mutually coaxial left and right support shafts 216 are protruded respectively to support the cover 210 pivotally with respect to the storage case body 220.

The storage case body 220 is also a member which is formed by injection molding from resin material. The storage case body 220 has a rectangular bottom wall portion 221, case side wall portions 222 and 223 provided upright on both side ends and the rear end of said bottom portion 221, and a case rear wall portion 224. In addition, a portion upon which these case side wall portions 222, 223 and the case rear wall portion 224 are not provided constitutes an insertion port for the MD cartridge 60 to be inserted into the storage space.

It is noted that these case side wall portions 222, 223 and the case rear wall portion 224 are constructed so that when the cover 210 is closed with respect to the storage case body 220, the cover side wall portions 212 and 213 and the cover rear wall portion 214 of the cover 210 are stored therein.

Further, in the vicinity of the inner surface of the case rear wall portion 224, the pair of left and right case side wall portions 222 and 223 are respectively provided with a pair of engaging recesses 225 and 225 which are disposed so as to face each other mutually. When the cover 210 is enclosed and the MD cartridge 60 is inserted, the pair of the left and right elastic lock members 215 are urged to engage the engaging recesses 225 and 225 respectively, thereby keeping the cover 210 and the storage case body 220 in an enclosed state, Further, a pair of mutually coaxial left and right shaft support slots 226 are respectively formed on the inner surface of the forward ends of the pair of left and right case side wall portions 222 and 223. The support shafts 216 of the cover 210 are respectively inserted into the pair of mutually coaxial left and right shaft support slots 226.

It is so arranged that on a forward edge 211a of the upper wall portion 211 is formed a notch 211b, while on a forward edge 221a of the bottom wall portion 221 is formed a notch 221b, whereby as the MD cartridge 60 is stored in said MD cartridge storage case 200, one can easily remove said cartridge by pinching the rear end thereof through the notches 211b, 221b in the direction of insertion.

The index sheet 230 is, as shown in FIG. 19, a piece of paper cut into the preset shape and folded into L-shape. The cut paper is made of a body portion 231 which can come into close contact with the inner wall of the bottom wall portion 221 of the storage case body 220 and a back cover portion 232 which can come into close contact with the inner wall of the case rear wall portion 224 of the storage case body 220.

When the cover 210 is closed to the storage case body 220, the back cover portion 232 of the index sheet 230 is held between the cover rear wall portion 214 and the case rear wall portion 224 and both side portions 231a and 231a are being held by the cover side wall portions 212 and 213 and the bottom wall portion 221 of the storage case body 220, whereby despite insertion/ejection of the MD cartridge 60 from the MD cartridge storage case 200, it is impossible for the index sheet 230 to be pulled outside due to friction with the MD cartridge 60.

Referring next to FIG. 20 and FIG. 21, description will be provided about the characteristic portions of the MD cartridge storage case 200 according to the fourth embodiment. The cover 210 is pivotally supported about the storage case body 220 by inserting the support shafts 216 thereof into the support shaft slots 226 of the storage case body 220, and as shown in FIG. 20 the cover 210 is pivotally rotated by 180 or more degrees from the completely closed position to the completely open position of the storage case body 220.

As shown in an enlarged view of FIG. 21, when the cover 210 is rotated around the axis of rotation C with respect to the storage case body 220, the dimensions of each portions are established in such a manner that a rear end corner portion 212a of the cover side wall portion 212 and a forward edge 211a of the upper wall portion 211 which constitute the end of the insertion port side of the cover 210 are not respectively interfere with the inner wall of the bottom wall portion 221 of the storage case body 220. In other words, the position of the axis of rotation C is set so as to satisfy relationships of L1>L2 and L1>L3, where L1 defines the shortest distance between the axis of rotation C and the inner wall of the bottom wall portion 221, that is, the length of a line containing the axis of rotation C and extending in a direction perpendicular to the inner wall of the bottom wall portion 221; L2 defines a distance from the axis of rotation C to the rear end corner portion 212a of the cover side wall portion 212; and L3 defines a distance between the axis of rotation C to the forward edge 211a of the upper wall portion 211.

It is preferably designed that the position of the axis of rotation C is preset in advance. Namely, the dimensions of L1 are determined first, and then the dimensions of L2 and L3 are established so as to satisfy the aforementioned formulas. Further, it is also preferable that the rear end corner portion 212a of the cover side wall portion 212 is made in the shape of R so as to make the actual distance L2 shorten.

Accordingly, in the MD cartridge storage case 200 of the fourth embodiment, when the cover 210 is opened by rotation thereof from the closed state about the axis of rotation C, it is possible to open the cover 210 completely by over 180 degrees as shown in FIG. 20, because the end of the insertion port side of the cover 210 which is approaching the bottom wall portion 221 of the storage case body 220 is not interfere with the inner wall of the bottom wall portion 221.

As a result, the MD cartridge storage case 200 of this embodiment enables the index sheet 230 to be easily stored in the MD cartridge storage case 200.

Moreover, as far as the RD cartridge storage case 200 of this embodiment is concerned, since the proper setting of the position of the axis of rotation C of the cover 210 as mentioned above makes it possible to avoid interference of the cover 210 with the storage case body 220, it is not necessary to shorten the end of the insertion port side of the cover towards the tip side of the case. Therefore, the MD cartridge 60 can be covered completely by the upper wall portion 211 of the cover 210 to assure protection.

Naturally, the disk cartridge storage case of this invention is not limited to the storage case of MD cartridges in the aforementioned embodiment but applicable to storage cases of other disk cartridges such as 3.5-inch floppy disks and optical disks. It also goes without saying that the shapes of the cover and the storage case body are not restricted to the shapes of the cover 210 and the storage case body 220 of aforementioned embodiment but may be made in a variety of forms.

It is noted that the characteristic portions of the MD cartridge storage case 200 according to this embodiment can be applied or combined with other embodiments according to the present invention.

From the foregoing description, it is clear that in the disk cartridge storage case according to the present invention, opening the storage case body and the cover facilitates placing the index sheet inside the storage space. Further, since when the cover is being opened, the end of the insertion port side of the cover does not interfere with the inner wall of the case body, the cover can be opened with certainty to the desired angle. In addition, by closing the storage case body and the cover, said index sheet is fixedly held to prevent the sheet from coming off easily, so that the index sheet can be placed easily in the storage case, while the index sheet stored int he disk cartridge storage case can be prevented from coming off easily.

A fifth embodiment of a cartridge storage case according to the present invention will be described hereunder in detail with reference to the accompanying drawings.

Figure 22:
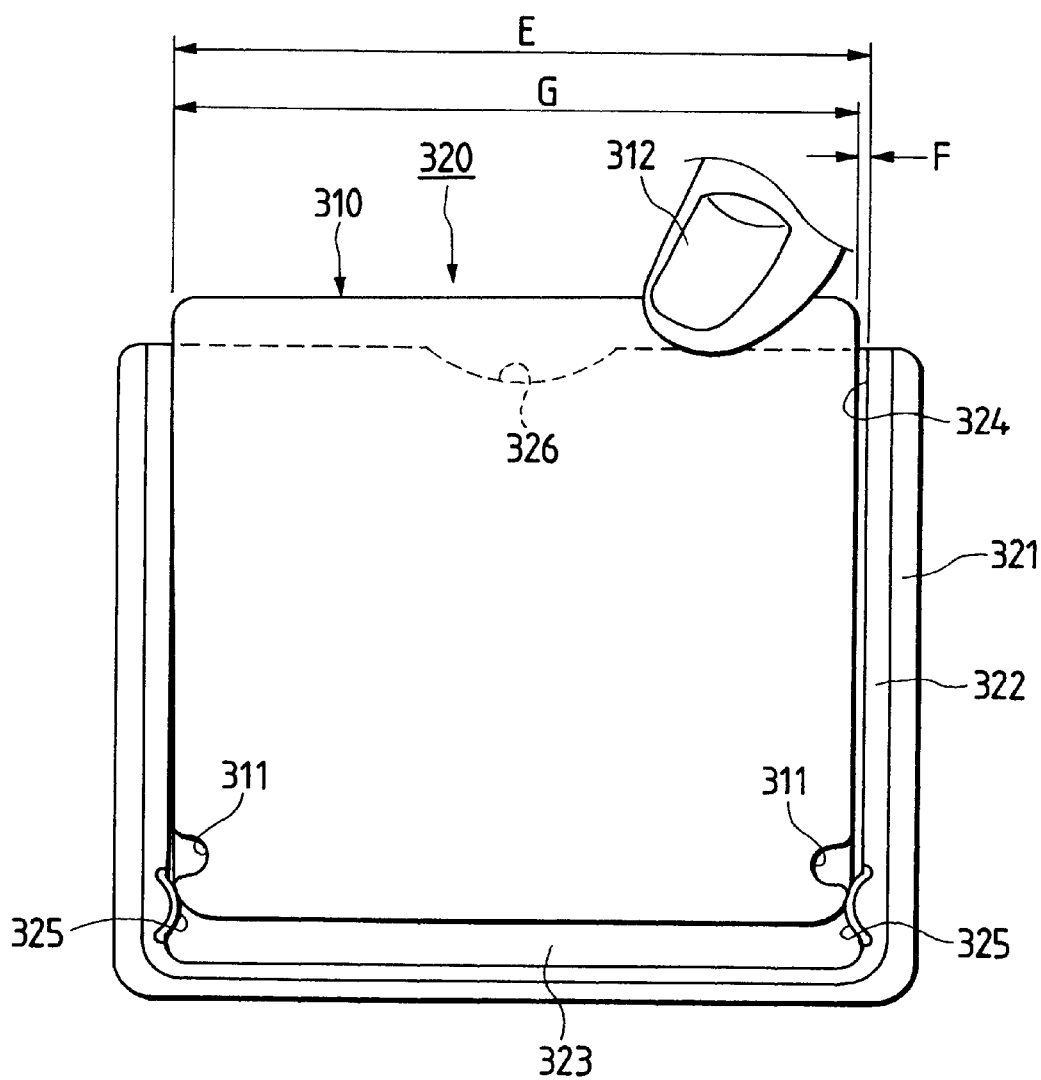
FIG. 22 is a plan view of a fifth embodiment of a cartridge storage case according to the present invention.
Figure 23:
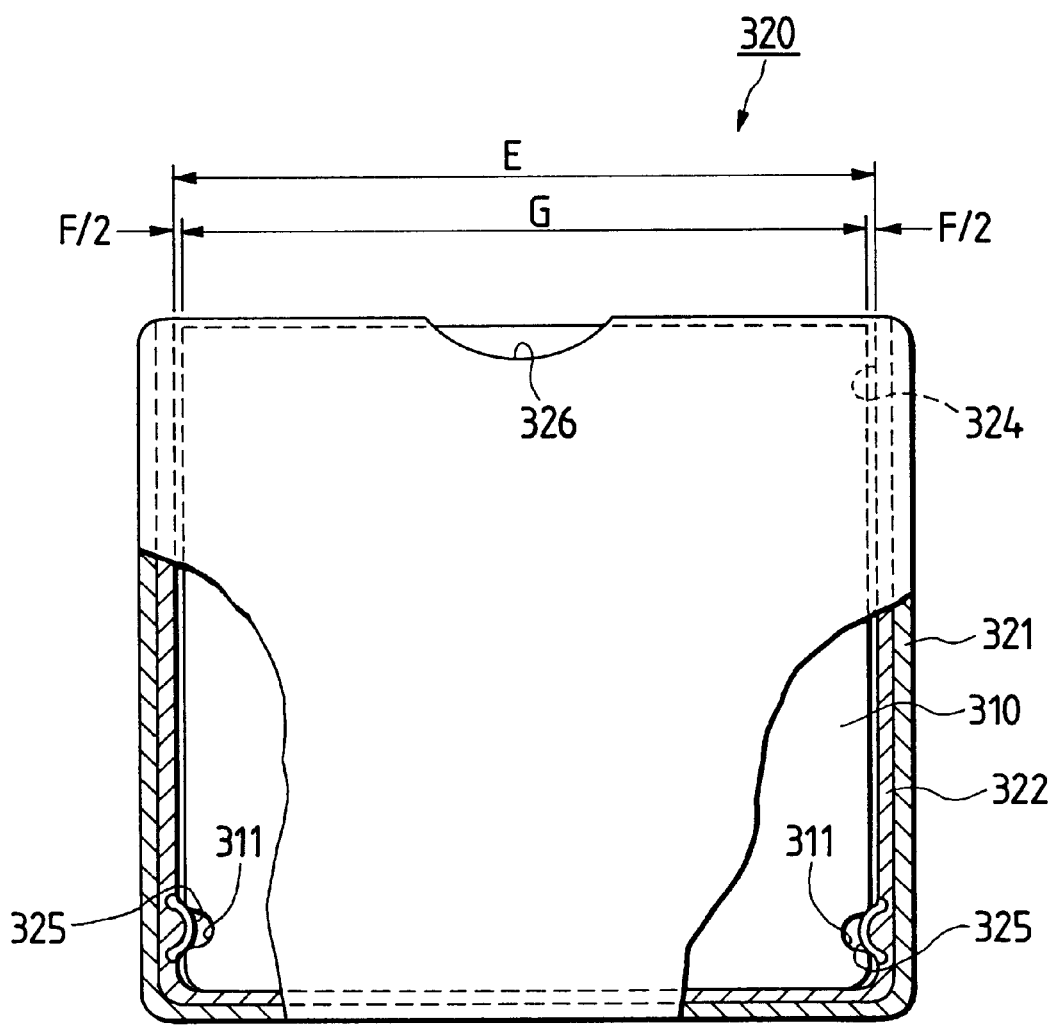
FIG. 23 is a partly-broken plan view of the cartridge storage case shown in FIG. 22.
Figure 24:
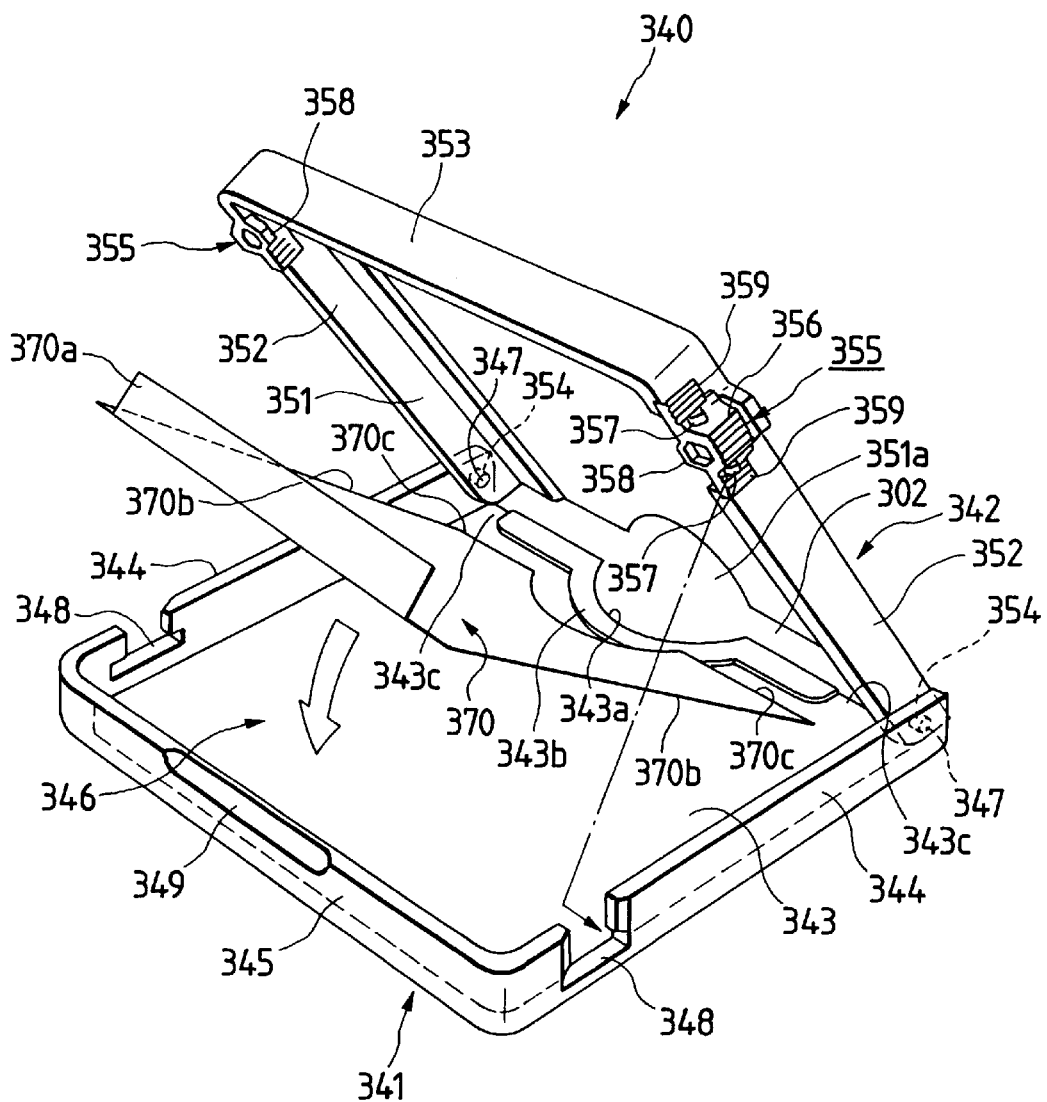
FIG. 24 is a whole perspective view of a sixth embodiment of the cartridge storage case according to the present invention.

FIG. 22 is a plan view showing a fifth embodiment of a cartridge storage case according to the present invention, and FIG. 23 is a partly broken plan view of the cartridge storage case in FIG. 22. FIG. 24 is a whole perspective view of a cartridge storage case according to a sixth embodiment of the present invention, FIG. 25 is an explanatory diagram in the case of disposing an index sheet in the cartridge storage shown in FIG. 24 and FIG. 26 is a whole perspective of view of the cartridge storage case shown in FIG. 24 in the state of closure. In explanation, a cartridge with a built-in MD (a dimension corresponding to G in FIG. 22 is approx. 71.43 mm) is employed as an example.

As shown in FIG. 22, in a cartridge storage case 320, an inner case 321 and an outer case 322 are respectively made of transparent plastic or the like and are formed approximately in a rectangular shape in plan, and the inner case 321 is fittingly inserted in the outer case 322.

An inner space 323 is defined between the inner case 321 and the outer case 322. A cartridge 310 accommodating an MD not illustrated herein can be stored in the inner space 323 in a specified direction through an insertion port 324 and detachably holds the cartridge 310 with a pair of elastic holder members 355 installed in the vicinity of the innermost portion (that is, the lower portion in FIG. 22) of the cartridge storage case 320.

In other words, when the cartridge 310 is inserted into the inner space 323 via the insertion port 324, the elastic holder members 325 and 325 respectively fit into recessed grooves 311 and 311 formed on left and right sides thereof in FIG. 22, thereby locking the cartridge 310 in the inner case 321.

Further, a notch 326 is formed in the inner case 321 from which part of the cartridge 310 is exposed. The thus exposed cartridge 310 is grasped by a fingertip 312 and pulled upward in FIG. 22. When the cartridge 310 is being detached from the inner space 323, the fitting insertion engagement between the elastic holder members 325 and the recessed grooves 211 and 311 of the cartridge 310 are respectively released.

A dimension E of the insertion port 324 in the longitudinal direction is determined so that a gap F which is defined between the cartridge 310 to be in the cartridge storage case 320 and the insertion port 324 is set in the range of 0.1 mm–0.71 mm. Namely, the gap F is directed to a gap which is produced between one end (end on the right side in FIG. 22) of the cartridge 310 and the end of the insertion port 324 when the cartridge 310 to be stored is pushed to the one end of the insertion port 324 (end on the left side in FIG. 22). The gap F is predetermined in depended upon an external dimension G of the cartridge to be stored in the left to right direction in FIG. 22, in such a manner that the gap F is set to satisfy a formula of $14/10,000G < F < 100/10,000G$. Since the outer dimension G of the cartridge 10 having a built-in MD is approx. 71.43 mm, the dimension G is substituted in the above formula to obtain a desirable range of approx. $0.1\text{ mm} < F < 0.71\text{ mm}$.

Next, description will be made about a cartridge storage case based on a sixth embodiment of the present invention as shown in FIG. 24 to FIG. 26.

As FIG. 24 illustrates, 8 cartridge storage case 340 in which a cartridge 330 (see FIG. 26) includes a box-shaped body. comprising a storage case body 341 and a cover 353 provided openably/closably on the storage case body 341 and is formed of a thin parallelpiped.

The storage case body 341 comprises a cartridge storage space 346 which is a storage space of a disk cartridge with an open top thereof and which is made up of a bottom wall portion 343 with a curved recess 343a formed on the forward end thereof, case side wall portions 344 and 344 provided upright on the ends of both sides of the bottom wall portion 343 and a case rear wall portion 345 provided upright at the rear end of the bottom wall portion 343.

On the bottom wall portion 343 with a curved recess 343a formed thereon is formed a stepped portion 343b along the forward end. As a tip 370c of an index sheet 370 inserted in the storage case body abuto the stepped portion 343b, in such a manner that the index sheet 370 can be positioned by the stepped portion 343b in the cartridge storage space 346.

It is noted that since the stepped portion 343b is formed excluding both ends 343c and 343c on the forward end of the bottom portion 343, when the cartridge 330 is inserted into or ejected out from the cartridge storage case 340, there is no likelihood that a corner portion 330d (see FIG. 26) of a shutter 330c installed on the cartridge 330 is caught by the edge of the insertion port of the cartridge storage case 340. Accordingly it is possible to prevent smooth insertion/ejection of the cartridge 330 from being interrupted.

The cartridge storage space 346 is nearly equal in size to the cartridge 330. The case side wall portions 344 and 344 have the inner surfaces of the forward ends wherein rotary shafts 347 are coaxially protruded, and lock portions 348 and 348 are formed an the inner surfaces of the rear ends.

Further, the case rear wall portion 345 is provided with a recess 349 which is recessed so as to be catchable by finger.

A cover 350, being made of transparent resin such as polycarbonate, polystyrene, and AS resin, has an upper wall portion 351 covering the top of the storage case body 341, cover side wall portions 352 and 352 which are provided upright on ends of both sides and are in close contact with the inside of the case rear wall portion 345, and a cover rear wall portion 353 which is provided upright on the rear end of the upper wall portion 351 and is in close contact with the inside of the case rear wall portion 345. On the forward end of the upper wall portion 351 is formed a curved recess 351a.

The cover rear wall portions 352 and 352 are provided with slots 354 and 354 into which the rotary shafts 347 and 347 formed on the case side wall portions 344 and 344 are rotatably inserted and elastic holder members 355 which are designed to lock the cover 350 in the state of closure relative to the storage case body and to hold the cartridge within the storage space.

The elastic holder members 355 comprise release lugs 356 formed on the surface, lock claws 357 and 357 formed on both sides of the release lugs 356, MD cartridge holder portions 358 formed on the back side, and elastic portions 359 and 359 capable of elastic deformation on both sides.

Next, a case where the index sheet 370 is stored in the cartridge storage case 340 will be described.

Figure 25A:
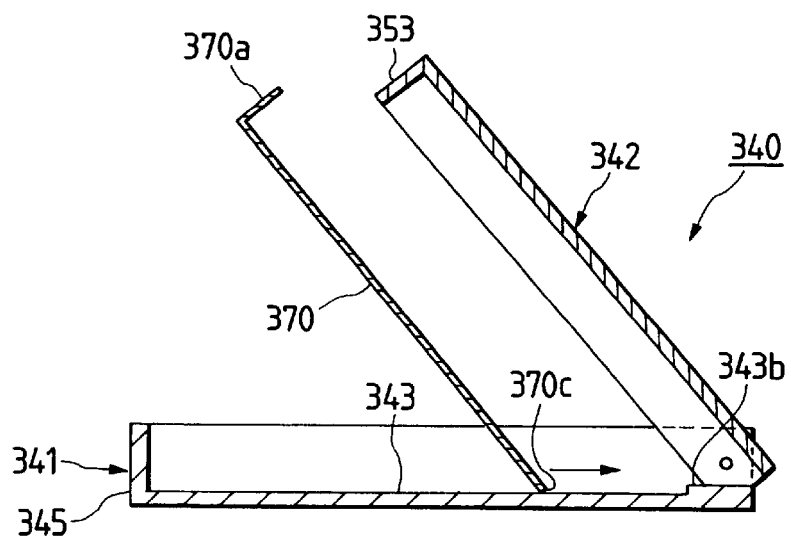
FIG. 25 is an explanatory diagram of the case where an index sheet is disposed in the cartridge storage case shown in FIG. 24.
Figure 25B:
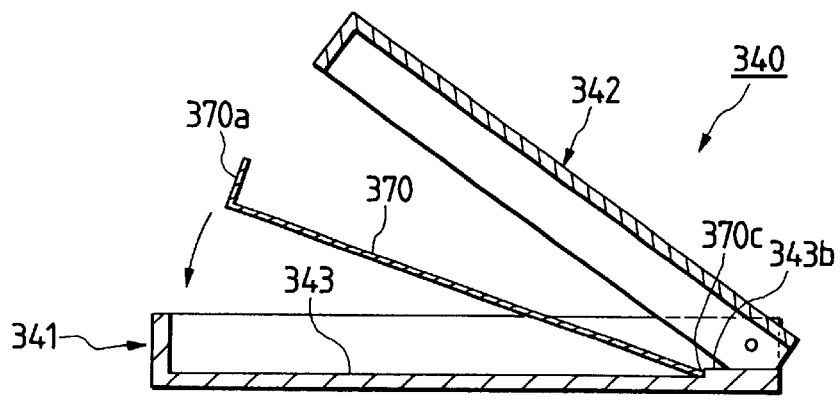
Figure 25C:
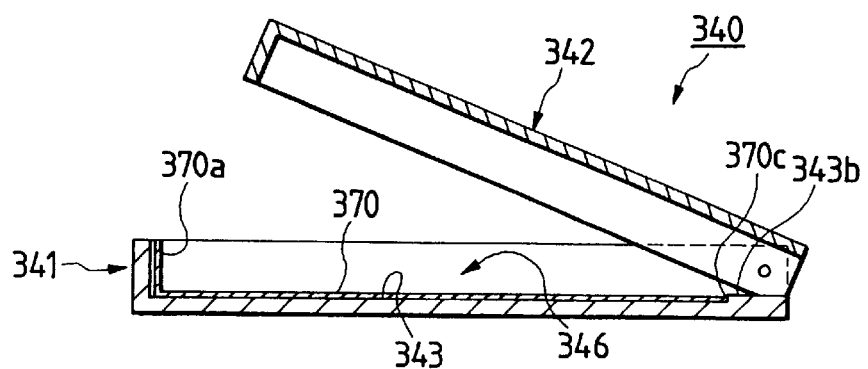
Figure 26:
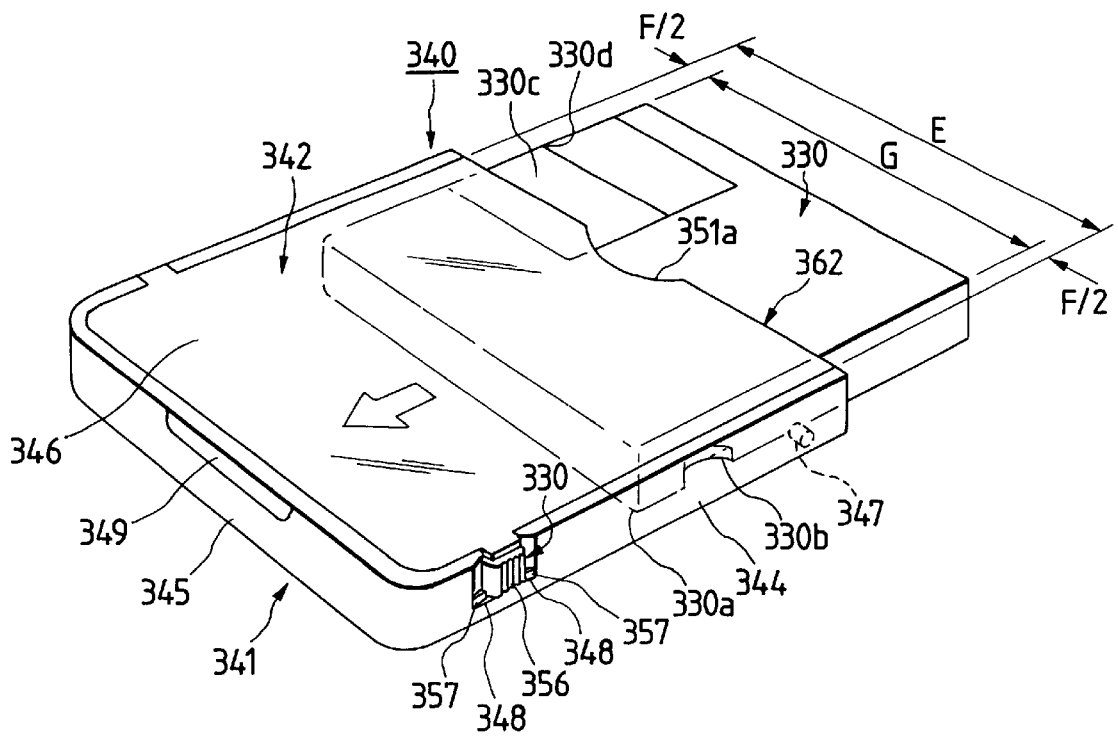
FIG. 26 is a whole perspective view of the cartridge storage case shown in FIG. 24 in the state of closure.

First, as shown in FIG. 25(a), when a tip 370c of the index sheet 370 is placed in abutment with the bottom wall portion 343 of the storage case body 341, the tip 370c of the index sheet 370 slides in the direction of arrow, the tip 370c abuts the stepped portion 343b of the bottom wall portion 343 as shown in FIG. 25(b). Thereafter, a bent portion 370a of the index sheet 370 which is bent in a L-shape in section moves down to contact the bottom wall portion 343, thereby placing the index sheet 340 in the cartridge storage space 346 of the storage case body 341. In other words, since the forward end 340c of the index sheet 340 abuts the stepped portion 343b so as to be positioned when the index sheet 370 is stored, there is no likelihood of the index sheet 370 slipping down from the bottom wall portion 343 and causing extra work in storage.

Next, when the cover 350 shown in FIG. 24 is rotated about the rotary shafts 347 and 347 to close the case storage body 341, the lock claws 357 and 357 abut the inner surfaces of the case side wall portions 344 and 344, and the elastic holder members 355 enter into the inside of the case side wall portions 344 and 344. In this case, the elastic portions 359 and 359 are in a stretched state. The lock claws 357 and 357, after getting over the case side wall portions 344 and 344, fit into the lock portions 348 and 348 shown in FIG. 26, due to the urging force of the elastic portions 359 and 359, whereby the cover 350 is kept maintained in the state of closure relative to the storage case body 341.

At this instant, the index sheet 340 is brought to the state where the bent portion 370a in the L-shape in section is held by the cover rear wall portion 353 and the case rear wall portion 345, and both side portions 370b and 370b of the index sheet are being held by the cover side wall portions 352 and 352 and the bottom wall portion 343 of the storage case body 341, whereby the index sheet 340 is securely held in the cartridge storage space 346.

Next, a case where the cartridge 330 is stored in the cartridge storage case 340 will be described.

As shown in FIG. 26, the cartridge 330 is inserted into the cartridge storage space 346 through the insertion port 362 while the cover 350 is being closed relative to the storage case body 341. Forward end corner portions 330a and 330a of the inserted cartridge 330 abut the cartridge holder portions 358 (see FIG. 24) and push the cartridge holder portions 358 to the outside.

At this point, since the stepped portion 343b provided on the bottom wall portion 343 is formed on the front edge thereof excluding the end portions 343c and 343c (see FIG. 24), there is no likelihood that the stepped portion 343b interferes with passage of the corner portion 330d of the shutter 330c when the cartridge 330 is being inserted into the cartridge storage case 340.

As the cartridge 330 is further inserted from this position, the cartridge holder portions 359 enter into the recessed grooves 330b and 330b (only one of which is illustrated herein) formed on both sides of the forward end portion of the cartridge 330, Accordingly, the cartridge 330 is held so as not to come off the storage space 346.

By fitting the cartridge holder portions 358 into the recessed grooves 330b and 330b of the cartridge 330 the elastic holder members 355 can be simultaneously fixed and switched into a locked state, so that it becomes impossible to release the locked State of the cartridge holder portions 358 with a finger even if an attempt to grip0012 and push the release lugs 364 of the elastic holder members 355 is given.

Consequently, there is no possibility of the cover 342 opening from the storage case body 341 while the cartridge 330 is being inserted into the cartridge storage case 340.

The dimension E in the longitudinal direction of the insertion port 362 is determined so that a gap F defined by the cartridge 330 is in the range of 0.1 mm to 0.71 mm.

Namely, the gap F is directed to a gap defined between the other end (end on the upper side in FIG. 26) when the cartridge 310 to be stored is pushed to one end of the insertion port 324 (end on the lower side in rig. 26). However, in FIG. 26, the gaps F/2 and F/2 are defined and illustrated at both ends of the cartridge 330 stored within the cartridge storage case 320.

The gap F is set in depended upon an external dimension G along the obliquely longitudinal direction of the cartridge 330 to be stored in FIG. 26, in such a manner that a relationship therebetween meets a formula of 14/10,000G<F<100/10,000G. Since the external dimension G of the cartridge 310 having a built-in MD is approx. 71.43 mm, the dimension G is substituted in the above formula to obtain a range of approx. 0.1 mm<F<0.71 mm.

Next, the cartridge storage case 320 according to the fifth embodiment described above will be used to describe the result of an experiment on the operability in storing the cartridge 310 by changing the numerical values of the gap F.

EXAMPLE 1

There was conducted 100 times an experiment using the cartridge storage case 320 of the fifth embodiment with the setting of the gap F being 0.4 mm wherein part of the cartridge 310 was grasped by the fingertip 312 and inserted into the inner space 323 from the insertion port 324. The results of the experiment with the Example 1 was that the cartridge 310 was never caught between the edges of the insertion port 324 and the elastic holder members 325.

EXAMPLE 2

The same experiment using the cartridge storage case 320 of the fifth embodiment with the setting of the gap F being 0.1 mm was conducted 100 times. The results of the same experiment with the Example 2 was that the cartridge 310 was never caught between the edges of the insertion port 324 and the elastic holder members 325. However, it was difficult to position the cartridge 310 accurately to the insertion port of the cartridge storage case 320.

EXAMPLE 3

The same experiment using the cartridge storage case 320 of the fifth embodiment with the setting of the gap F being 0.7 mm was conducted 100 times. The results of this experiment was that the cartridge 310 was never caught between the edges of the insertion port 324 and the elastic holder members 325.

Comparative Example 1

The same experiment as the Example 1 described above using the conventional cartridge storage case 330 (FIG. 24) with the setting of the gap F being 0.9 mm was conducted 100 times. The results of this experiment was that the cartridge 310 was caught 32 times between the edges of the insertion port 334 (FIG. 24) and the lock members 335 (FIG. 24).

From the results of Example 1 through Example 3 and Comparative Example 1 above, it is understood that as compared to the conventional cartridge storage case 330, the cartridge storage case 320 of the fifth embodiment of the present invention described above has exceptionally superior operability in storing the cartridge 310.

As the foregoing explanation shows, according to the fifth embodiment, the dimension E of the insertion port 324 in the longitudinal direction is set so that the gap F relative to the cartridge 310 stored in the storage space 323 is not less than 14/10,000 times and not more than 100/10,000 times as large as the dimension of the cartridge. In case of the MD cartridge storage case, the gap F is preferably set in the range from 0.1 mm to 0.71 mm. Consequently, storage of the cartridge 310 can be performed with certainty and ease, while maintaining good operability. Hence, it becomes ensured that the cartridge 310 to be stored or the cartridge storage case 320 can be prevented from being damaged.

In other words, when the cartridge 310 is being inserted into the inner space 323 through the insertion port 324 by grasping the corner portion thereof with the fingertip 312, a conventional posture of the cartridge 310 which is oblique to the insertion port 334 (FIG. 24) can be prevented from occurring. Therefore, it is possible to ensure that the cartridge 310 is prevented from being held and caught between the edge of the insertion port and the lock members 335. As a result, the cartridge 310 or the elastic holder members 325 of the cartridge storage case 320 can be surely prevented from being damaged.

In addition, the outer dimensions of the cartridge storage case 320 can be decreased to obtain superior portability, while clatter and other noise generating upon contact between the cartridge 310 and the inner case 321 can be reduced with certainty.

Further, since the cartridge storage case 340 of the sixth embodiment according to the present invention as described above is constructed that the gap F thereof is set at the same dimension as that of the cartridge storage case 320 of the fifth embodiment, it goes without saying that the same action and effects as above can be produced.

Still further note that, in the fifth embodiment, the cartridge storage case 320 is assembled by four parts consisted of the outer case 322, the inner case 321, and a pair of the elastic holder members 324, Nevertheless, the four parts 321, 322, and 325 may be integrally incorporated. Further, only the outer case 322 and the inner case may be constructed in one piece. Furthermore, although the elastic holder members 325 are provided separately from the inner case 321 in the embodiment, it can be integrally incorporated in the inner case 321. The members 325 may also be constructed separately or in one piece with the outer case 322.

For the foregoing description, the MD cartridge storage case was taken as an example and explained for the sake of convenience. Nonetheless, the present invention is not limited to such case but applicable to other cases storing optical disks and floppy disk cartridges. Needless to say, there may be changes of specific dimensional specifications shown in the MD cartridge storage came depending on the size of cartridge to be stored.

As the foregoing description shows, according to the present invention, the dimension of the insertion port in the longitudinal direction is set in such a manner that a gap relative to the cartridge stored in the storage portion is not less than 14/10,000 times and not more than 100/10,000 times as large as the dimension of the cartridge along the longitudinal direction of the insertion port. Consequently, storage of the cartridge can be accomplished with certainty and ease, and superior operability can be maintained, so that the cartridge to be stored or the cartridge storage case proper can be surely prevented from being damaged.

A seventh embodiment of the present invention will be described hereunder with reference to the accompanying drawings.

Figure 28:
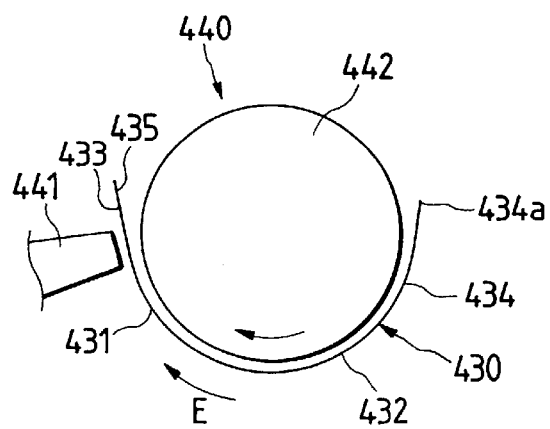
FIG. 28 is a side view schematically showing the state of printout on an index card by a printer in FIG. 27.
Figure 27:
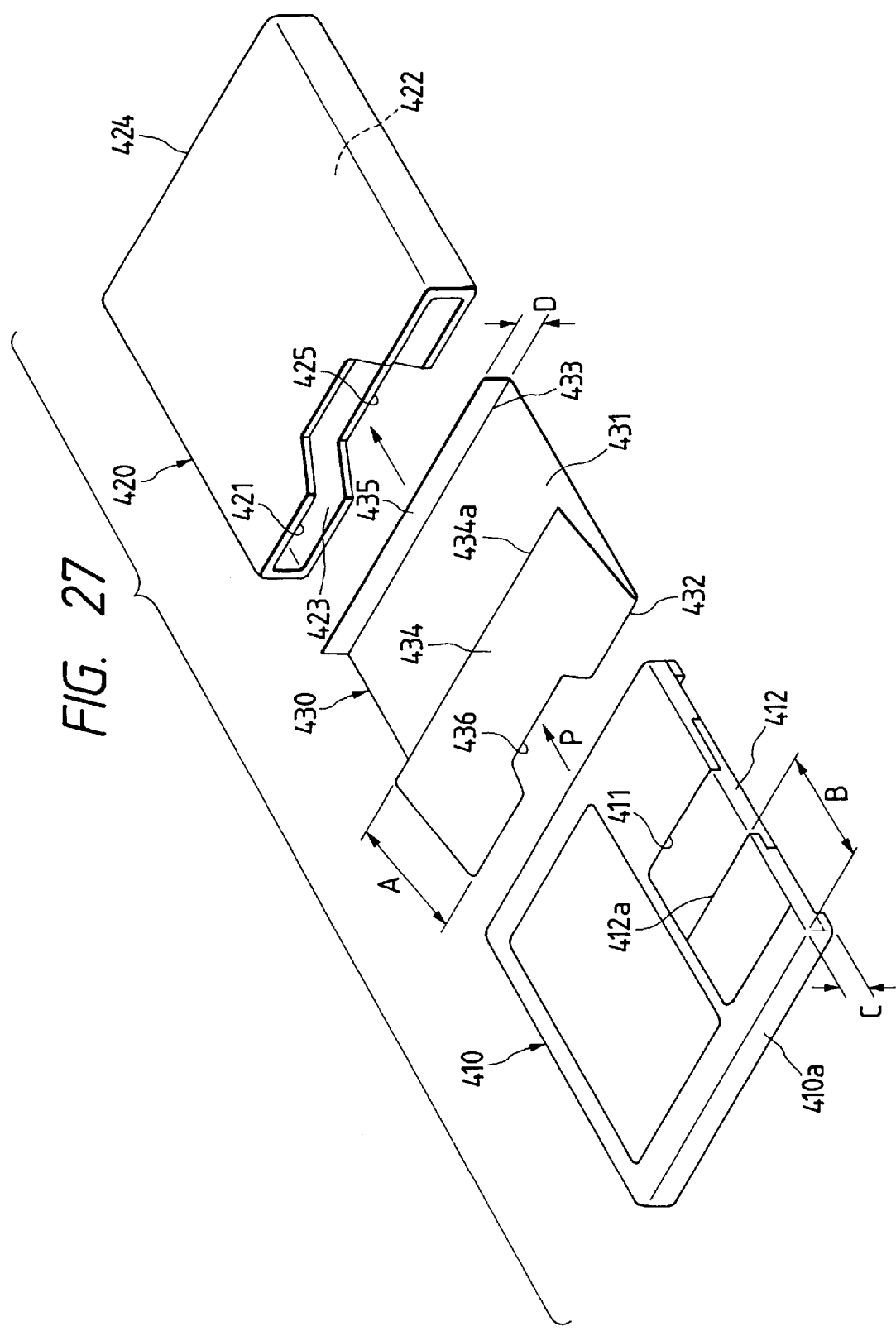
FIG. 27 is a perspective view of an index card, a cartridge and a cartridge storage case of the seventh embodiment according to the present invention.

FIG. 27 is a perspective view showing an index card, a cartridge, and a cartridge storage case of the seventh embodiment according to the present invention, and FIG. 28 is a side view schematically showing the state of an index card of an embodiment being printed by a printer.

In FIG. 27, an index card 430 is attached to a cartridge storage case 420 of the slot-in type which can store a cartridge 410 with a built-in, disk-like recording medium not illustrated herein through an insertion port 421 into a storage portion 422.

Namely, when the index card 430 is inserted through the insertion port 421 into the storage portion 422 of the cartridge storage case 420 in a preset direction as indicated by an arrow P, the bottom portion of the card body 432 in FIG. 27 is brought in abutment with an inner surface 423 of the bottom side of the cartridge storage case 420 shown in FIG. 27.

An edge 432 on the insertion port 421 side of the card body 431 (hereinafter referred to as the edge 432) is bent in a double folding manner toward an end portion 433 (hereinafter referred to as the base end portion) on the opposite side to the insertion port 421, thus forming a folded part which has a predetermined length A along the longitudinal direction of the card body 431. The folded part 434 is brought in contact with approximately one-third of the bottom portion of the cartridge 410 in FIG. 27 to be stored in the cartridge storage case 420 while the other side of the folded part is brought in contact with the card body.

The predetermined length A of the folded part 434 is determined in such a manner that the free-end edge 434a of the folded part 434 of the index card 430 is positioned between a spine portion 435 and an edge portion 412a, being located on the insertion port 423 side, of the shutter 412 when the cartridge 410 having a shutter 412 in a closure state and the index card 430 are stored in preset positions of the cartridge storage case 420.

Accordingly, it is possible to ensure that when the cartridge 410 is being released from the cartridge storage case 420, the edge portion 412a of the shutter 412 is prevented from being caught by the free-end edge 434a of the folded part 434 of the index card 430.

The base end portion 433 of the card body 431 is bent at an approximately right angle, forming the spine portion 435 which has a preset length D along the longitudinal direction of the card body 431 substantially corresponding to a dimension C as in the thickness direction of the cartridge 410, The spine portion 435 comes in abutment with a base bottom portion 424 of the cartridge storage case 420 when the index card 430 is stored in the cartridge storage case 420.

A numeral 436 in FIG. 27 indicates a notch formed by the edge 432 of the card body 431, the notch 436 corresponding to a notch 425 formed on the cartridge storage case 420. These notches 436 and 425 permit part of the cartridge 410 stored in the storage portion 422 to be exposed to the outside. The cartridge 410 is detached from the storage portion 422 while the exposed part is grasped by fingers (not illustrated herein) and pulled toward this side in FIG. 27.

Since the index card according to the present invention is constructed above, in the vicinity of the end portion of the index card which is located on the insertion port side of the storage case, the prior art structure in which a section cut by cutter is exposed can be changed to the double folded structure. Thereby, a durability can be improved.

Furthermore, the position of the free-end edge 434a of the folded part 434 of the index card 430 is located between the spine portion side and the edge portion 412a of the shutter 412 when the shutter 412 provided on the cartridge 410 is in the state of closure, so that when the cartridge 410 is detached from the cartridge storage case 420, the free-end edge 434a of the folded part 434 and the shutter side end portion 412a do not get caught, thereby making smooth detaching operation possible.

In the seventh embodiment, there is described the index card 430 attached to the cartridge storage case 420 storing the MD cartridge. However, the index card of the present invention is also applicable to cartridge storage cases (not illustrated herein) storing cartridges having a built-in recording medium of a disk shape (not illustrated herein) such as optical disks, magneto-optic disks, and flexible disks (FD) according to other standards.

The index card 430 of this embodiment is highly suitable for printout (printout along the direction of arrow E) by a printer 440 such as a word processor from the base end portion 433 to the edge 432.

Figure 3:
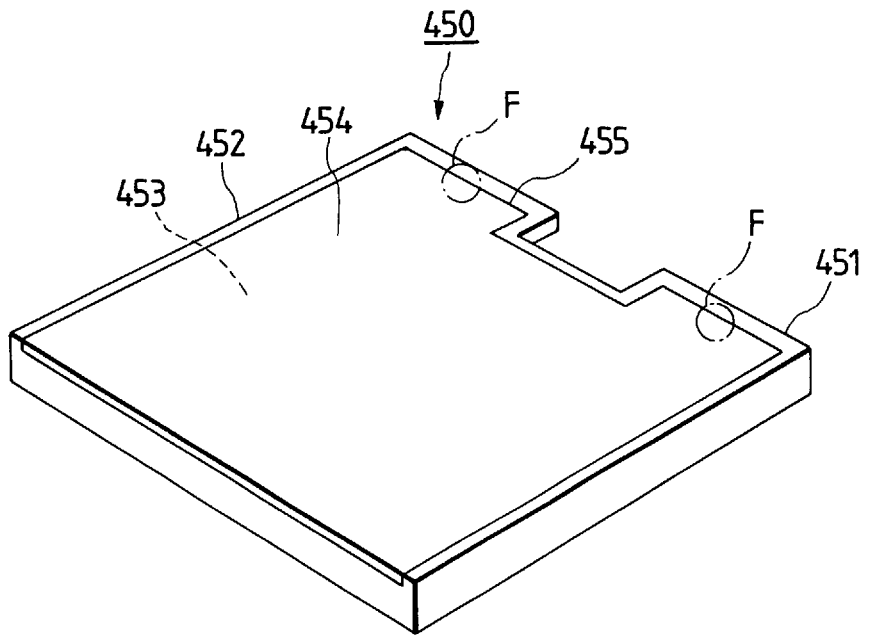
FIG. 3 is a perspective view showing a conventional index card and cartridge storage case.
Figure 2:
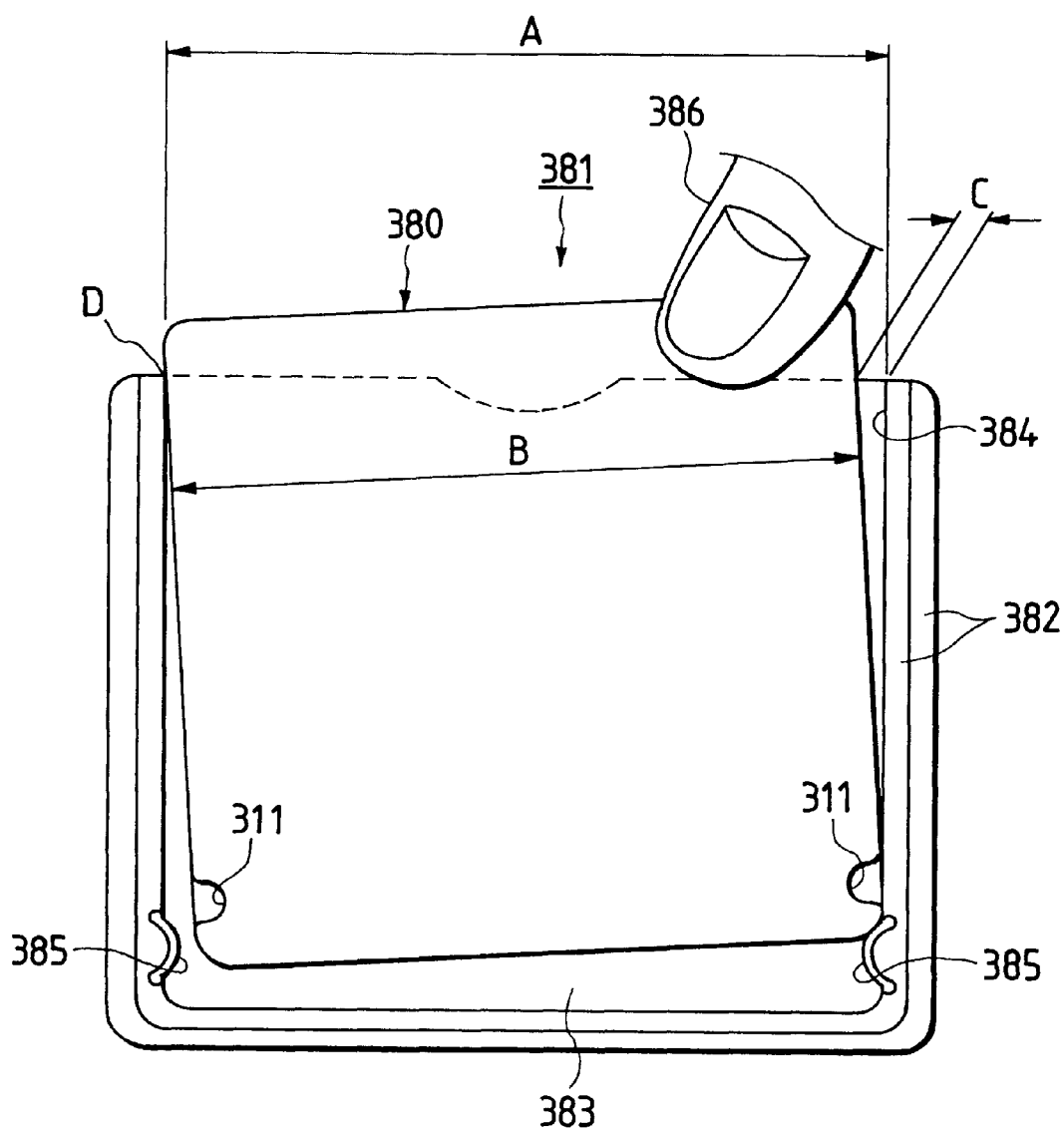
FIG. 2 is a whole perspective view of the other conventional cartridge storage case.

In other words, as shown in FIG. 28, in the printer 440, the printing position by a print head 441 is generally located forward in the direction of arrow E rather than the position in which the index card 430 is held by a drum 442 and a paper pressing member (not illustrated herein). Consequently, an index card 454 (FIG. 3) conventionally used with a short dimension along the direction of arrow E made it physically impossible to start printout from the vicinity of the base end portion, whereas the index card 430 according to this embodiment has a dimension along the direction of arrow E larger than that of the conventional index card 454 by a portion of the folded part 434 so that it is possible to start printout from the vicinity of the base end portion 433.

In view of the foregoing explanation, according to the present invention, as a result of the usage of the double folded structure for the index card, the structure in the vicinity of the end portion of the index card which is located at the insertion port side of the storage case is changed to the double folded structure from the prior art structure in which a section cut by cutter is exposed. Accordingly, the durability can be improved.

Moreover, when the cartridge 410 is detached from the cartridge storage case, the edge of the folded part and the side end portion of the shutter do not get caught, therefore, smooth detaching operation is made possible, In addition, printout on the index card by word processor, etc. is possible to make index cards good appearance.

Note that although in order to facilitate better understanding of the subject matter of the present invention, in the above-mentioned description the first to seventh preferred embodiments according to the present invention are separately explained, it goes without saying that these embodiments can be combined with one another. while there has been described in connection with the preferred embodiment of the invention, it will be obvious to those skilled in the art that various changes and modifications may be made therein without departing from the invention, and it is aimed, therefore, to cover in the appended claim all such as changes and modifications as fall within the true spirit and scope of the invention.

What is claimed is:

1. A combination of an index card and a cartridge storage case comprising:

a cartridge storage case having a storage portion designed for storing a cartridge with a built-in disk-like recording medium and an index card, the case having an insertion port to receive the cartridge and the card; and, the index card comprising a card body having a base end and a folded edge opposite the base end, the card body to be inserted in a preset direction through said insertion port into said storage portion of said cartridge storage case, the base end having a spine portion, and a folded part which is formed by bending a free end part of said card body toward the base end at the folded edge in a double folding manner, wherein the folded part has a front side contacted with the card body and a back side contacted with the cartridge after the folded part is folded and the cartridge is inserted in the cartridge storage case, and wherein the folded part has a predetermined length that is less than a length of the card body between the folded edge and the base end, and wherein the folded edge and folded part are positioned such that a cartridge slides over the folded edge and folded part when the cartridge is inserted into the cartridge storage case.

2. The index card according to claim 1, in which said predetermined length is set at approximately one-third of the length of the cartridge to be stored in said cartridge storage case in an insertion direction.

3. The index card according to claim 1 wherein the predetermined length is such that the free end part is positioned between the spine portion of the card and an edge portion of a shutter on the cartridge when the shutter is in a closure state and the cartridge and card are stored in preset positions of the case.

* * * * *